US007757300B2

(12) United States Patent
Nonaka et al.

(10) Patent No.: US 7,757,300 B2
(45) Date of Patent: Jul. 13, 2010

(54) DIGITAL INFORMATION RECORDING AND REPRODUCING METHOD AND APPARATUS THEREFOR

(75) Inventors: Tomoyuki Nonaka, Fujisawa (JP); Manabu Sasamoto, Yokohama (JP); Hiroo Okamoto, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1129 days.

(21) Appl. No.: 11/227,860

(22) Filed: Sep. 14, 2005

(65) Prior Publication Data

US 2006/0077825 A1    Apr. 13, 2006

(30) Foreign Application Priority Data

Oct. 13, 2004  (JP)  ............................ 2004-298331
Oct. 13, 2004  (JP)  ............................ 2004-298332
Oct. 13, 2004  (JP)  ............................ 2004-298333

(51) Int. Cl.
G06F 7/04      (2006.01)
G06F 17/30     (2006.01)
H04N 7/16      (2006.01)

(52) U.S. Cl. ........................................ 726/31; 380/59
(58) Field of Classification Search ................... 380/59; 386/94, 109; 713/189; 369/47; 726/27, 726/31
See application file for complete search history.

(56) References Cited

U.S. PATENT DOCUMENTS

| 6,807,365 | B1 * | 10/2004 | Aoki ........................... 386/109 |
| 6,938,162 | B1 * | 8/2005 | Nagai et al. ................ 713/189 |
| 7,126,892 | B2 * | 10/2006 | Sako et al. ............... 369/47.22 |
| 7,448,086 | B2 * | 11/2008 | Sako et al. ................... 726/27 |
| 2002/0071555 | A1 * | 6/2002 | Akiyama .................... 380/203 |
| 2003/0012375 | A1 * | 1/2003 | Sako et al. .................... 380/59 |
| 2003/0156716 | A1 | 8/2003 | Yokosawa |
| 2003/0215217 | A1 * | 11/2003 | Horii et al. .................... 386/94 |
| 2005/0268344 | A1 | 12/2005 | Matsukawa et al. |

FOREIGN PATENT DOCUMENTS

JP    2002-184114 A    6/2002

(Continued)

OTHER PUBLICATIONS

Bloom, J.A.; protection for DVD video; Publication Date: Jul. 1999; NSPEC; vol. 87, Issue: 7; On pp. 1267-1276.*

(Continued)

Primary Examiner—Kambiz Zand
Assistant Examiner—Monjour Rahim
(74) Attorney, Agent, or Firm—Townsend and Townsend and Crew LLP

(57) ABSTRACT

A method is disclosed wherein a first piece of digital information and copy control information of the first piece of digital information is received. The copy control information is for controlling the recording of the first piece of digital information on a recording medium. When the received copy control information is Copy One Generation indicating that only one generation copy of digital information is allowed, then a plurality of the first pieces of digital information are recorded on a first recording medium as the first piece of digital information and a second piece of digital information, wherein the first piece of digital information is different in format or in bit rate from the second piece of digital information.

1 Claim, 18 Drawing Sheets

FOREIGN PATENT DOCUMENTS

| | | |
|---|---|---|
| JP | 2002-238023 A | 8/2002 |
| JP | 2002-319227 | 10/2002 |
| JP | 2003-032617 A | 1/2003 |
| JP | 2003-151242 A | 5/2003 |
| JP | 2003-229846 A | 8/2003 |
| JP | 2003-233948 A | 8/2003 |
| JP | 2004-118986 A | 4/2004 |
| JP | 2004-185152 A | 7/2004 |
| JP | 2004-246996 A | 9/2004 |
| WO | WO00/52684 | 8/2000 |

OTHER PUBLICATIONS

Japan Patent Office (JPO) office action dated Nov. 20, 2007 for JPO patent application JP2004-298331.

* cited by examiner

FIG.8

| MANAGEMENT INFORMATION REGION 501 | | | | | | | DATA REGION 502 |
|---|---|---|---|---|---|---|---|
| FILE NUMBER 0_1 | DATE AND TIME 1 | ADDRESS 1 | KEY INFOR-MATION 1 | BIT RATE | COPY INFOR-MATION | NUMBER OF MOVES | ENCRYPTED DATA 1 |
| FILE NUMBER 0_2 | DATE AND TIME 1 | ADDRESS 2 | KEY INFOR-MATION 2 | BIT RATE | COPY INFOR-MATION | NUMBER OF MOVES | ENCRYPTED DATA 2 |
| FILE NUMBER 0_3 | DATE AND TIME 1 | ADDRESS 3 | KEY INFOR-MATION 3 | BIT RATE | COPY INFOR-MATION | NUMBER OF MOVES | ENCRYPTED DATA 3 |
| FILE NUMBER 1_1 | DATE AND TIME 2 | ADDRESS 4 | KEY INFOR-MATION 4 | BIT RATE | COPY INFOR-MATION | NUMBER OF MOVES | ENCRYPTED DATA 4 |
| FILE NUMBER 1_2 | DATE AND TIME 2 | ADDRESS 5 | KEY INFOR-MATION 5 | BIT RATE | COPY INFOR-MATION | NUMBER OF MOVES | ENCRYPTED DATA 5 |
| FILE NUMBER 1_3 | DATE AND TIME 2 | ADDRESS 6 | KEY INFOR-MATION 6 | BIT RATE | COPY INFOR-MATION | NUMBER OF MOVES | ENCRYPTED DATA 6 |
| FILE NUMBER 2_1 | DATE AND TIME 3 | ADDRESS 7 | KEY INFOR-MATION 7 | BIT RATE | COPY INFOR-MATION | NUMBER OF MOVES | ENCRYPTED DATA 7 |
| FILE NUMBER 2_2 | DATE AND TIME 3 | ADDRESS 8 | KEY INFOR-MATION 8 | BIT RATE | COPY INFOR-MATION | NUMBER OF MOVES | ENCRYPTED DATA 8 |
| FILE NUMBER 2_3 | DATE AND TIME 3 | ADDRESS 9 | KEY INFOR-MATION 9 | BIT RATE | COPY INFOR-MATION | NUMBER OF MOVES | ENCRYPTED DATA 9 |
| ⋮ | ⋮ | ⋮ | ⋮ | ⋮ | ⋮ | ⋮ | |
| FILE NUMBER n_1 | DATE AND TIME n | ADDRESS n | KEY INFOR-MATION n | BIT RATE | COPY INFOR-MATION | NUMBER OF MOVES | ENCRYPTED DATA n |
| FILE NUMBER n_2 | DATE AND TIME n | ADDRESS o | KEY INFOR-MATION o | BIT RATE | COPY INFOR-MATION | NUMBER OF MOVES | ENCRYPTED DATA o |
| FILE NUMBER n_3 | DATE AND TIME n | ADDRESS p' | KEY INFOR-MATION p | BIT RATE | COPY INFOR-MATION | NUMBER OF MOVES | ENCRYPTED DATA p |
| 503 | 504 | 505 | 506 | 507 | 508 | 509 | 510 |

FIG.11

| MANAGEMENT INFORMATION REGION 501 ||||||| DATA REGION 502 |
|---|---|---|---|---|---|---|---|
| FILE NUMBER 0_1 | DATE AND TIME 1 | ADDRESS 1 | KEY INFOR- MATION 1 | BIT RATE | | | ENCRYPTED DATA 1 |
| FILE NUMBER 0_2 | DATE AND TIME 1 | ADDRESS 2 | KEY INFOR- MATION 2 | BIT RATE | COPY INFOR- MATION | NUMBER OF MOVES | ENCRYPTED DATA 2 |
| FILE NUMBER 0_3 | DATE AND TIME 1 | ADDRESS 3 | KEY INFOR- MATION 3 | BIT RATE | | | ENCRYPTED DATA 3 |
| FILE NUMBER 1_1 | DATE AND TIME 2 | ADDRESS 4 | KEY INFOR- MATION 4 | BIT RATE | | | ENCRYPTED DATA 4 |
| FILE NUMBER 1_2 | DATE AND TIME 2 | ADDRESS 5 | KEY INFOR- MATION 5 | BIT RATE | COPY INFOR- MATION | NUMBER OF MOVES | ENCRYPTED DATA 5 |
| FILE NUMBER 1_3 | DATE AND TIME 2 | ADDRESS 6 | KEY INFOR- MATION 6 | BIT RATE | | | ENCRYPTED DATA 6 |
| FILE NUMBER 2_1 | DATE AND TIME 3 | ADDRESS 7 | KEY INFOR- MATION 7 | BIT RATE | | | ENCRYPTED DATA 7 |
| FILE NUMBER 2_2 | DATE AND TIME 3 | ADDRESS 8 | KEY INFOR- MATION 8 | BIT RATE | COPY INFOR- MATION | NUMBER OF MOVES | ENCRYPTED DATA 8 |
| FILE NUMBER 2_3 | DATE AND TIME 3 | ADDRESS 9 | KEY INFOR- MATION 9 | BIT RATE | | | ENCRYPTED DATA 9 |
| ⋮ | ⋮ | ⋮ | ⋮ | ⋮ | ⋮ | ⋮ | ⋮ |
| FILE NUMBER n_1 | DATE AND TIME n | ADDRESS n | KEY INFOR- MATION n | BIT RATE | | | ENCRYPTED DATA n |
| FILE NUMBER n_2 | DATE AND TIME n | ADDRESS o | KEY INFOR- MATION o | BIT RATE | COPY INFOR- MATION | NUMBER OF MOVES | ENCRYPTED DATA o |
| FILE NUMBER n_3 | DATE AND TIME n | ADDRESS p' | KEY INFOR- MATION p | BIT RATE | | | ENCRYPTED DATA p |
| 503 | 504 | 505 | 506 | 507 | 508 | 509 | 510 |

| TITLE | RECORDING DATE AND TIME | RECORDING MODE |
|---|---|---|
| AAAAA | 04/08/09(MONDAY) 21:00-22:00 | XP |
| BBBBB | 04/08/20(FRIDAY) 19:00-19:30 | SP |
| CCCCC | 04/09/01(WEDNESDAY) 08:15-09:00 | TS |
| DDDDD | 04/09/09(THURSDAY) 12:00-13:00 | XP |

(b)

| TITLE | RECORDING DATE AND TIME | ALLOWABLE NUMBER OF MOVES |
|---|---|---|
| AAAAA | 04/08/09(MONDAY) 21:00-22:00 | 2 |

(c)

| TITLE | RECORDING DATE AND TIME | DESTINATION TO MOVE |
|---|---|---|
| AAAAA | 04/08/09(MONDAY) 21:00-22:00 | OPTICAL DISK |
| | | 1394 |
| | | MEMORY CARD |
| | | HDD |

(d)

| TITLE | RECORDING DATE AND TIME | ALLOWABLE NUMBER OF MOVES |
|---|---|---|
| AAAAA | 04/08/09(MONDAY) 21:00-22:00 | 1 |

(e)

| TITLE | RECORDING DATE AND TIME | RECORDING MODE |
|---|---|---|
| BBBBB | 04/08/20(FRIDAY) 19:00-19:30 | SP |
| CCCCC | 04/09/01(WEDNESDAY) 08:15-09:00 | TS |
| DDDDD | 04/09/09(THURSDAY) 12:00-13:00 | XP |

| TITLE | RECORDING DATE AND TIME | RECORDING MODE |
|---|---|---|
| AAAAA | 04/08/09(MONDAY) 21:00-22:00 | XP |
| BBBBB | 04/08/20(FRIDAY) 19:00-19:30 | SP |
| CCCCC | 04/09/01(WEDNESDAY) 08:15-09:00 | TS |
| DDDDD | 04/09/09(THURSDAY) 12:00-13:00 | SP |

(b)

| TITLE | RECORDING DATE AND TIME | RECORDING MODE |
|---|---|---|
| BBBBB | 04/08/20(FRIDAY) 19:00-19:30 | SP |
| | | LP |

(c)

| TITLE | RECORDING DATE AND TIME | DESTINATION TO MOVE |
|---|---|---|
| BBBBB | 04/08/20(FRIDAY) 19:00-19:30 | OPTICAL DISK |
| | | 1394 |
| | | MEMORY CARD |
| | | HDD |

(d)

| TITLE | RECORDING DATE AND TIME | RECORDING MODE |
|---|---|---|
| BBBBB | 04/08/20(FRIDAY) 19:00-19:30 | SP |

(e)

| TITLE | RECORDING DATE AND TIME | RECORDING MODE |
|---|---|---|
| AAAAA | 04/08/09(MONDAY) 21:00-22:00 | XP |
| CCCCC | 04/09/01(WEDNESDAY) 08:15-09:00 | TS |
| DDDDD | 04/09/09(THURSDAY) 12:00-13:00 | SP |

| TITLE (401) | RECORDING DATE AND TIME (402) | RECORDING MODE (403) |
|---|---|---|
| AAAAA | 04/08/09(MONDAY) 21:00-22:00 | XP |
| BBBBB | 04/08/20(FRIDAY) 19:00-19:30 | SP |
| CCCCC | 04/09/01(WEDNESDAY) 08:15-09:00 | TS |
| DDDDD | 04/09/09(THURSDAY) 12:00-13:00 | SP |

(400)

(b)

| TITLE (401) | RECORDING DATE AND TIME (402) | ALLOWABLE NUMBER OF MOVES (404) | RECORDING MODE (403) |
|---|---|---|---|
| BBBBB | 04/08/20(FRIDAY) 19:00-19:30 | 2 | SP |
| | | | LP |

(400)

(c)

| TITLE (401) | RECORDING DATE AND TIME (402) | DESTINATION TO MOVE (405) |
|---|---|---|
| BBBBB | 04/08/20(FRIDAY) 19:00-19:30 | OPTICAL DISK |
| | | 1394 |
| | | MEMORY CARD |
| | | HDD |

(400)

(d)

| TITLE (401) | RECORDING DATE AND TIME (402) | ALLOWABLE NUMBER OF MOVES (404) | RECORDING MODE (403) |
|---|---|---|---|
| BBBBB | 04/08/20(FRIDAY) 19:00-19:30 | 1 | SP |
| | | | LP |

(400)

(e)

| TITLE (401) | RECORDING DATE AND TIME (402) | RECORDING MODE (403) |
|---|---|---|
| AAAAA | 04/08/09(MONDAY) 21:00-22:00 | XP |
| CCCCC | 04/09/01(WEDNESDAY) 08:15-09:00 | TS |
| DDDDD | 04/09/09(THURSDAY) 12:00-13:00 | SP |

(400)

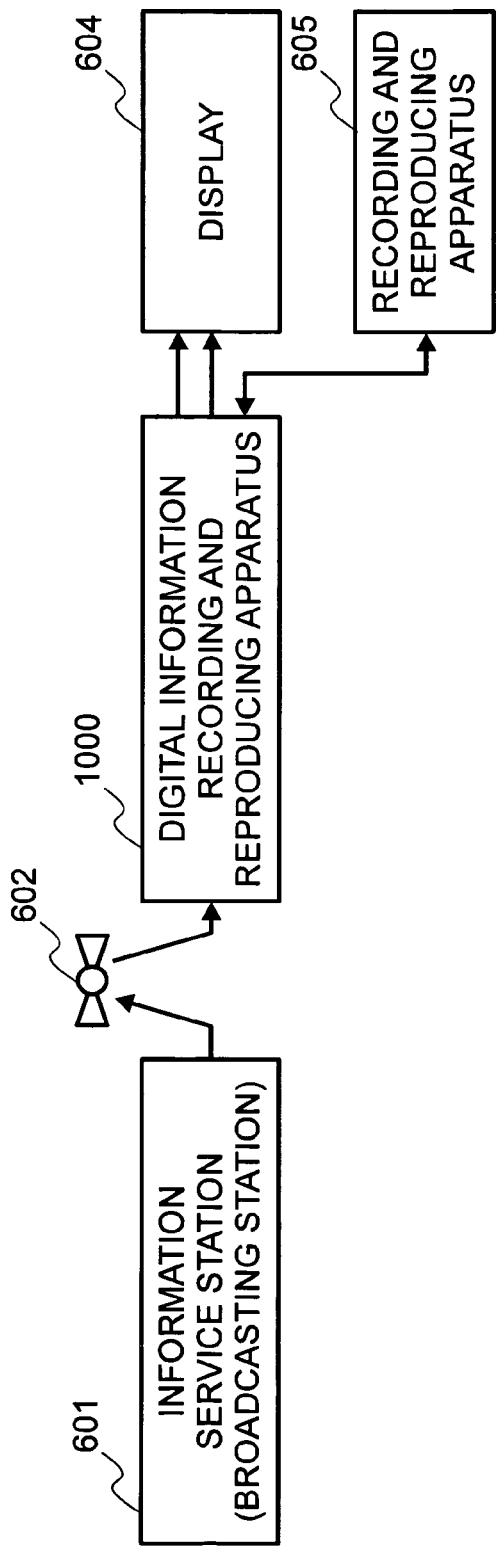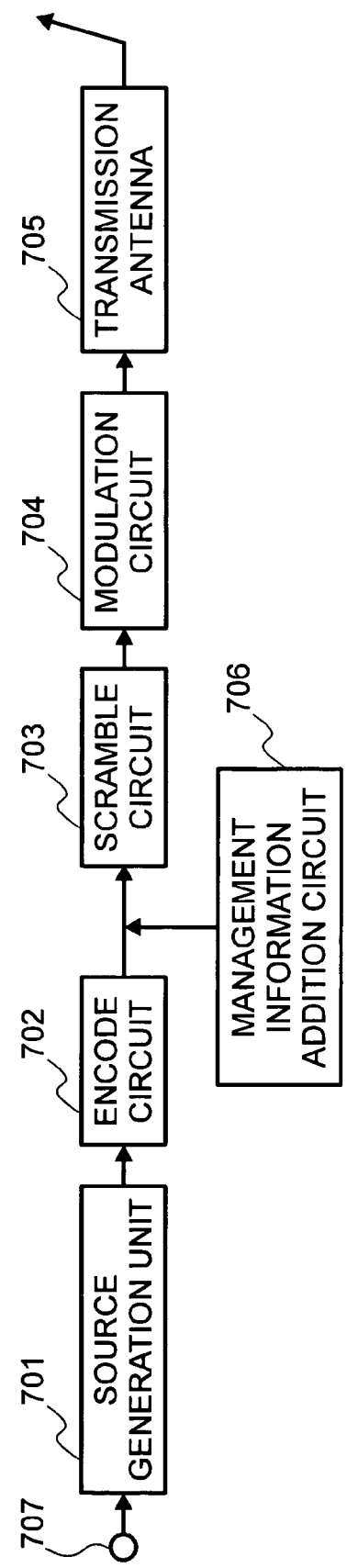

DIGITAL INFORMATION RECORDING AND REPRODUCING METHOD AND APPARATUS THEREFOR

BACKGROUND OF THE INVENTION

1. Field of the Invention

The present invention relates to an apparatus, capable of restricting the recording of digital information demanding copyright protection on a recording medium.

2. Description of the Prior Art

For patent literature relating to a recording and reproducing apparatus for digital content conforming to copy generation control, reference may be made to Japanese Patent Application Laid-Open No. 2002-319227 (JP-A-2002-319227, hereinafter). The JP-A-2002-319227 relates to a recording and reproducing apparatus for digital content in which when recording content with copy control information as "Copy One Generation", which indicates that only one generation of content can be copied, on a recording medium, a part of the content that fails to be recorded is compensated by recording the content as "Copy One Generation" content during the specified period, or the content that is recorded on a hard disk can be viewed by recording a plurality of the same pieces of content on the recording medium and further by backing up those on another recording medium.

SUMMARY OF THE INVENTION

A liquid crystal monitor with a high degree of accuracy has been recently mounted on a mobile terminal such as a cellular phone, enabling a user to view digital content on the way to his/her destination or at his/her destination. Under the circumstance, the recording and reproducing apparatus described in the JP-A-2002-319227 is considered to have a potential function to move one of the pieces of content to the mobile terminal thereby to make it possible for a user to view it on the terminal's screen.

However, JP-A-2002-319227 does not disclose any concrete means for realizing the function. And yet, the apparatus is not designed to have means for restricting the number of backups to other media. This prevents the copyright owner from specifying the allowable number of backups for the content of "Copy One Generation", which inhibits the copyright protection.

As potential backup media, there are various media such as a semiconductor memory, and an optical disk. These media have less recordable capacity compared to a hard disk coupled to the recording and reproducing apparatus, and needs to be designed to adopt their own data compression ratio instead of the data compression ratio used for recording to the hard disk.

In order to address the above-mentioned problems, provided herein are the aspects of the present invention.

A first aspect is directed to a digital information recording and reproducing method, having the steps of:

receiving a first piece of digital information and copy control information of the first piece of digital information, the copy control information being for controlling the recording of the first piece of digital information on a recording medium; and in the case where the received copy control information is Copy One Generation which indicates that only one generation copy of digital information is allowed, recording a plurality of the first pieces of digital information on a first recording medium as the first piece of digital information and a second piece of digital information, the first piece of digital information being different in format or in bit rate from the second piece of digital information.

A second aspect is directed to a method for recording and reproducing digital information and to an apparatus for the method, both having the steps or the functions of:

receiving a first piece of digital information and copy control information of the first piece of digital information, the copy control information being for controlling the recording of the first piece of digital information on a recording medium; and in the case where the received copy control information is Copy One Generation which indicates that only one generation copy of digital information is allowed, recording a plurality of the first pieces of digital information on a first recording medium as the first piece of digital information and a second piece of digital information, the first piece of digital information being different in format or in bit rate from the second piece of digital information.

The third aspect is directed to a method for recording and reproducing digital information and to an apparatus for the method, both having the steps or the functions of:

receiving a piece of digital information and copy control information of the piece of digital information, the copy control information being for controlling the recording of the piece of digital information on a recording medium and for specifying the allowable number of copies for the piece of digital information;

recording a first piece of digital information on a first recording medium; and copying automatically the first piece of digital information on the first recording medium as a second piece of digital information.

With regard to digital information demanding copyright protection, the apparatus and the method according to these aspects can impose restriction on recording media of the recording and reproducing apparatus, along with improved user-friendliness.

BRIEF DESCRIPTION OF THE DRAWINGS

Embodiments of the present invention will be described in detail based on the following figures, wherein:

FIG. 8 is a diagram showing a configuration of record management information according to the third embodiment of the present invention;

FIG. 11 is a diagram showing a configuration of record management information according to the fifth embodiment of the present invention;

FIG. 14 is a diagram showing one embodiment of an operation screen according to the first embodiment of the present invention;

FIG. 15 is a diagram showing one embodiment of an operation screen according to the third embodiment of the present invention;

FIG. 16 is a diagram showing one embodiment of an operation screen according to the fifth embodiment of the present invention;

FIG. 19 is a diagram showing one embodiment of digital broadcasting according to the eighth embodiment of the present invention; and FIG. 20 is a diagram showing one embodiment of an information service station according to the eighth embodiment of the present invention.

DESCRIPTION OF THE PREFERRED EMBODIMENTS

Hereinafter, embodiments of a digital information recording and reproducing apparatus according to the present invention will be described.

First Embodiment

1. Configuration Example of Making a Copy of Content Simultaneously with a Move of the Content In general, the term "move" means that content is moved from a first recording medium to a second recording medium, whereas the term "copy" means that the same content is replicated. Namely, the "move" does not increase the same content, whereas the "copy" increases the same content. However, in this application, it should be noted that the term "copy" includes the "move" that does not increase the same content.

Figure 1:
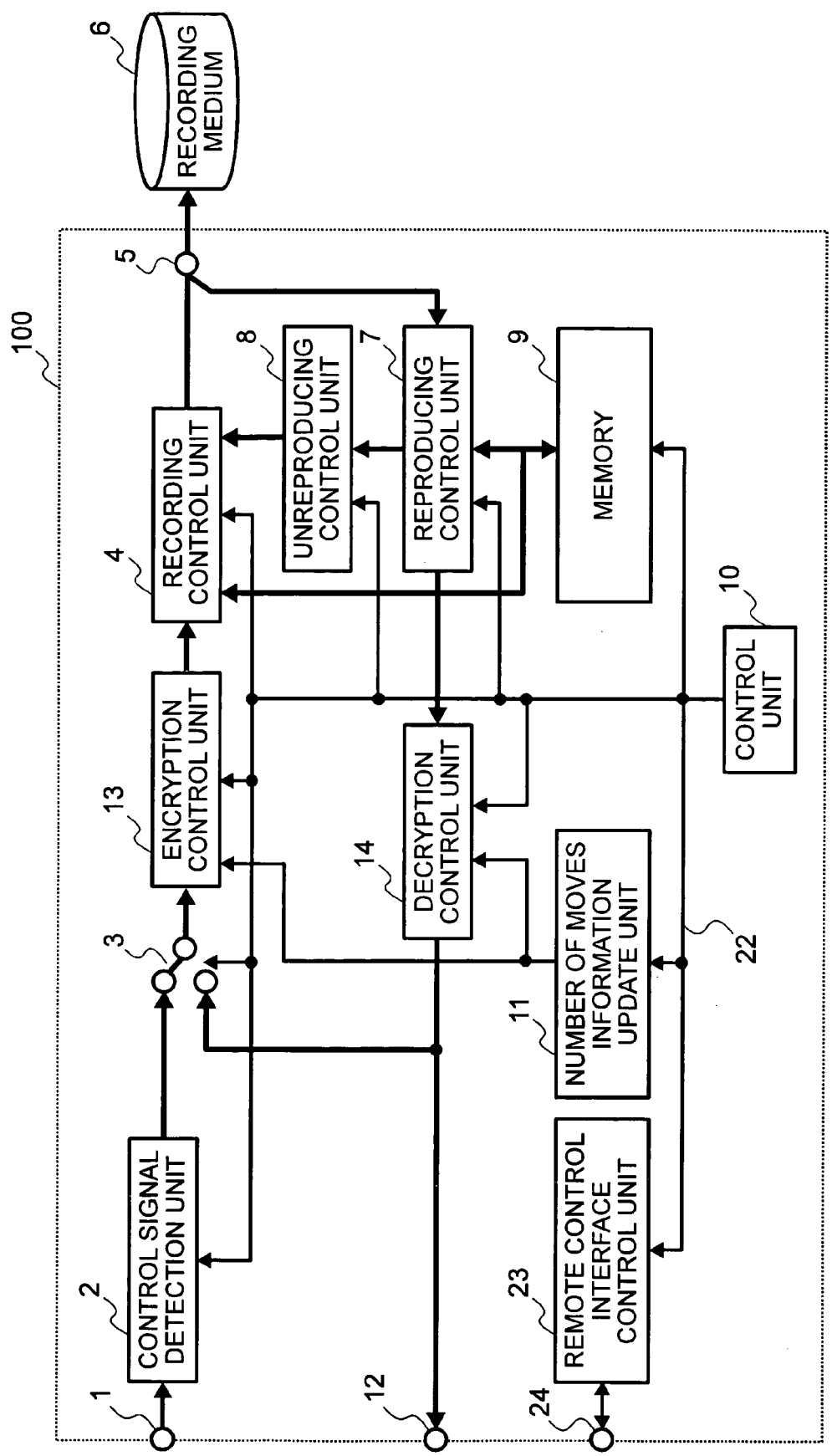
FIG. 1 is a block diagram showing one embodiment of a digital information recording and reproducing apparatus according to the first embodiment of the present invention.

FIG. 1 is a block diagram showing one embodiment of a digital information recording and reproducing apparatus 100 in which content with a copy generation control signal embedded is recorded on a recording medium such as a hard disk, and the specified number of moves to other media is allowed for the recorded content.

In FIG. 1, the numeral 1 denotes an input terminal into which, for example, an MPEG2 Transport Stream (hereinafter, referred to as MPEG2-TS) used for digital broadcasting and the like is supplied. The numeral 2 denotes a control signal detection unit that detects copy generation control information embedded in the input MPEG2-TS, and transmits a detection result to a control unit 10 through a control bus 22. The numeral 3 denotes a switching unit that switches the streams from the control signal detection unit 2 and a decryption control unit 14, to be described later, by control of the control unit 10. The numeral 13 denotes an encryption control unit that encrypts the input MPEG2-TS. The numeral 4 denotes a recording control unit that buffers a stream and/or management information to be recorded on a recording medium 6 to a memory 9 and simultaneously issues a command for recording so as to perform a stream transfer and the like. The numeral 5 denotes an input/output unit that couples the recording medium 6 to the digital information recording and reproducing apparatus 100 so as to perform a data transfer. The numeral 6 is the recording medium that is composed of, for example, a hard disk or the like. The numeral 7 denotes a reproducing control unit that issues a command to the recording medium 6 to reproduce the stream or the management information and then outputs the stream to the decryption control unit 14 while buffering the same to the memory 9. In addition, the reproducing control unit 7 supplies, for example, the management information or the stream to an unreproducing control unit 8, depending on a result detected by the control signal detection unit 2. The unreproducing control unit 8 performs a conversion process for making the input management information or stream impossible to reproduce and then supplies the resultant to the recording control unit 4. The numeral 9 denotes the memory for buffering each of the streams from the recording control unit 4 and the reproducing control unit 7 to a separate region to write or read the streams in a time-division mode, that is, the memory serves as a buffer to be continuously accessed. The memory 9 is composed of, for example, a semiconductor memory. The numeral 14 denotes the decryption control unit that decrypts the encrypted MPEG2-TS. The numeral 11 denotes the control unit that is composed of a microprocessor or the like and controls the digital information recording and reproducing apparatus 100. The numeral 11 denotes a number of moves information update unit that detects the number of times the recorded content on the recording medium 6 has been moved and then transmits the resultant to the control unit. The numeral 12 denotes an output terminal from which the content decrypted in the decryption control unit 14 is output. The numeral 22 denotes the control bus 22 through which data communications are performed between the control unit 10 and blocks, each of which is coupled to the control unit 10. The numeral 23 denotes a remote control interface control unit that transmits a signal for operating the digital information recording and reproducing apparatus 100 from outside by a user through an input/output unit 24, to the control unit 10.

Figure 2:
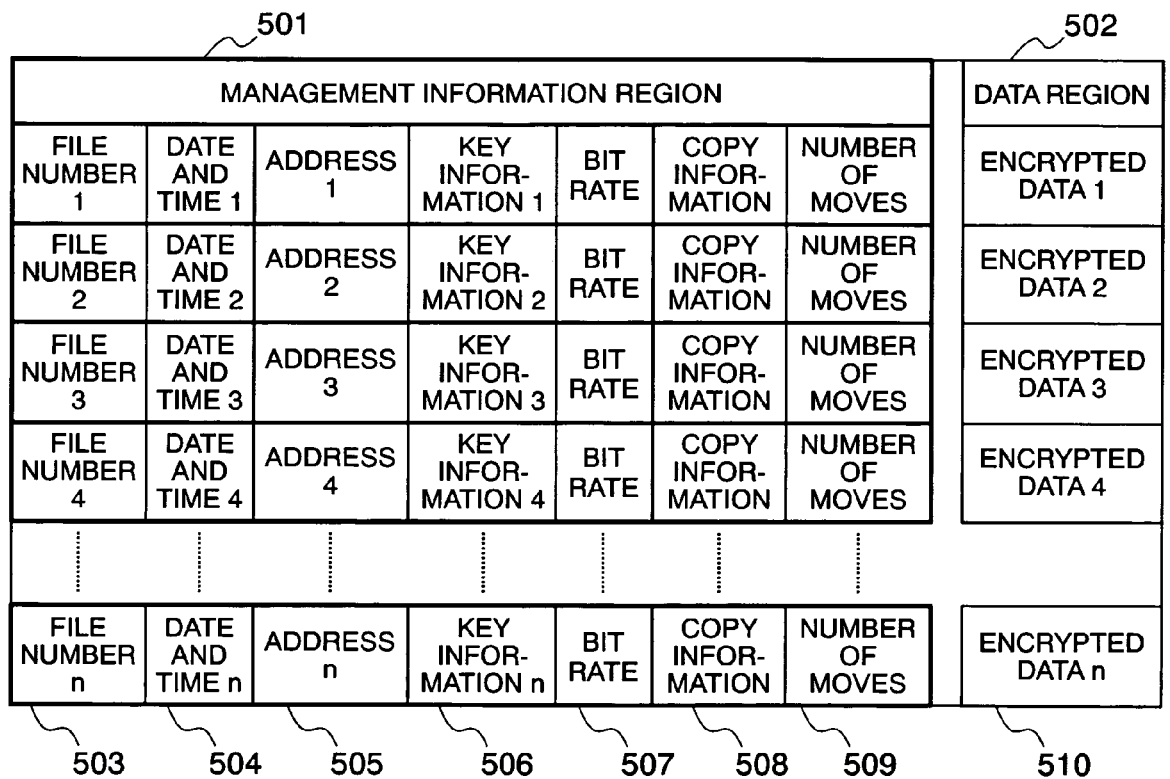
FIG. 2 is a diagram showing a configuration of record management information according to the first embodiment of the present invention.

FIG. 2 is a diagram showing an example in which pieces of content are recorded on the recording medium 6. For each piece of content, the management information showing details of the content and data of the content itself are recorded in a management information region 501 and a data region 502, respectively. The management information region 501 serves for recording the management information such as a file number 503 representing a title of the content, a top address and a recording size of the data region 505, copy information 508, the number of moves 509, and key information 506. The data region 502 serves for recording the content written from the address corresponding to the top address 505 recorded in the management information region 501. Every time new content is recorded, its management information and the content are sequentially recorded along with one-by-one addition of such a new title as file number 1, file number 2, file number n, and so on.

The copy information 508 is the copy generation control information detected in the control signal detection unit 2, and there are possible specification examples of a binary signal, where "00" represents "Copy Free" indicating that copies are allowed, "10" represents "Copy One Generation" indicating that only one generation of content can be copied, and "11" represents "copy Never" indicating that copies are prohibited. As another example of the binary signal, "Copy One Generation" content in the digital information recording and reproducing apparatus 100 may be defined as "01" representing "Copy No More" which indicates that no copies are allowed any more for content that was once copied in the state of "Copy One Generation". With regard to these specifications, reference can be made to specifications defined by ARIB-B21 (operational specifications of a digital broadcasting system defined by Association of Radio Industries and Businesses).

The number of moves 509 stores information that indicates the allowable number of copies, within which, for example, content recorded as "Copy No More" instead of "Copy One Generation" can be moved in the same or a different format. As an example, the number of moves 509 stores the value 2 that means 3 moves are allowed.

2. Explanation of the Encryption Control Unit and the Decryption Control Unit

Figure 3:
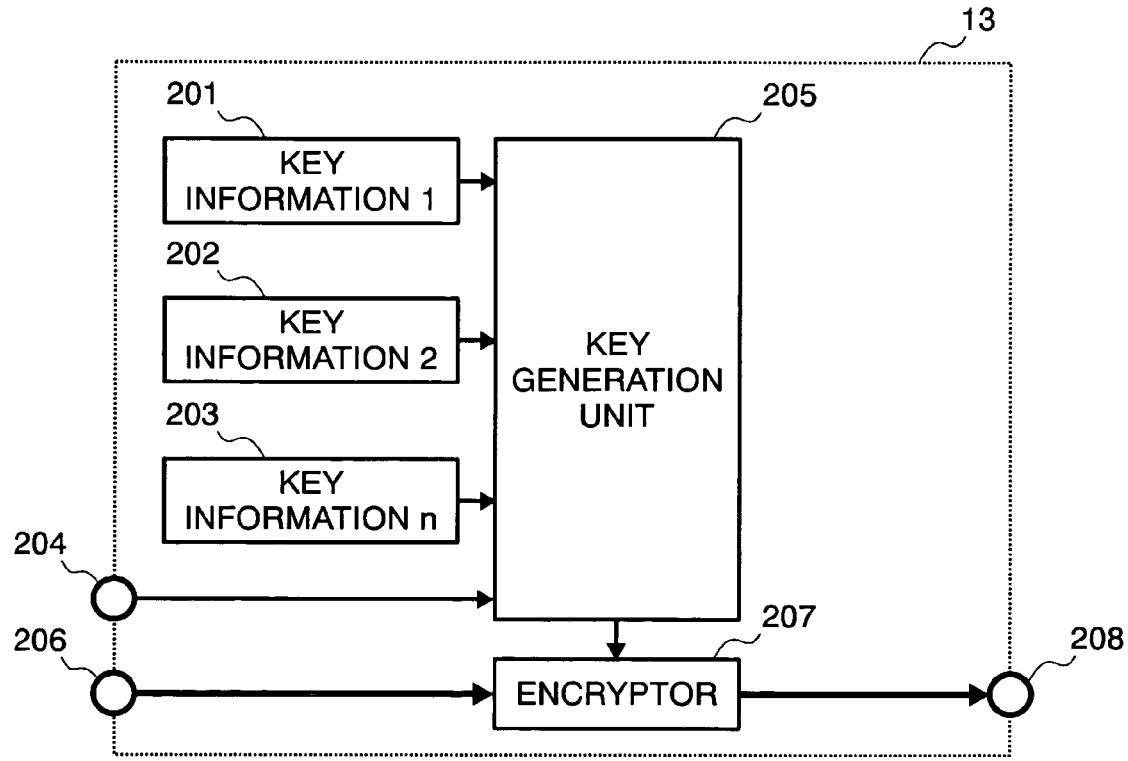
FIG. 3 is a block diagram showing a configuration example of an encryption control unit according to the first embodiment of the present invention.

FIG. 3 shows one embodiment representing a configuration of the encryption control unit 13. A plurality of blocks 201, 202 and 203 are pieces of key information, and as the key information, for example, unique information incorporated in the recording medium 6, a random number obtained by an arithmetic operation on a random number generator, and the like are used to serve as operands for an arithmetic operation of an encryption key. The numeral 204 denotes an input terminal into which, for example, a result retained in the number of moves information update unit is input as one of the pieces of key information. At least one of the pieces of key information 201 to 204 corresponds to the key information 506 in the management information region 501. The numeral 205 denotes a key generation unit for generating an encryption key by using the key information. The numeral 206 is an input terminal that is directly coupled to the switching unit 3 corresponding to the plaintext of data. The numeral 207 denotes an encryptor, and 208 denotes an output terminal from which a signal encrypted by the encryptor 207 is supplied to the recording control unit 4.

Figure 4:
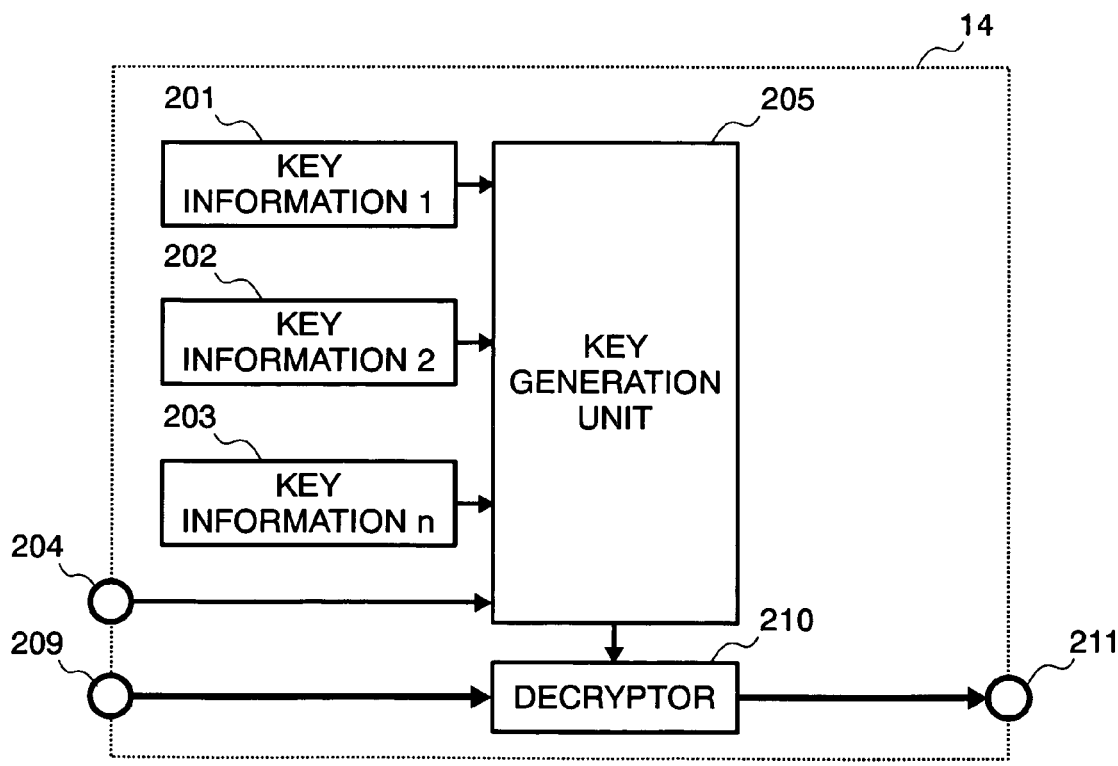
FIG. 4 is a block diagram showing a configuration example of a decryption control unit according to the first embodiment of the present invention.

FIG. 4 shows one embodiment representing a configuration of the decryption control unit 14. As similar to the configuration of the encryption control unit 13, the pieces of key information supplied from the key information 201, 202 and 203, and the pieces of key information supplied from the input terminal 204 are supplied to the key generation unit 205 to generate a decryption key. The numeral 209 denotes an input terminal into which a signal obtained by reproducing the encrypted text recorded on the recording medium 6 through the reproducing control unit 7 is supplied. The numeral 210 denotes a decryptor, and 211 denotes an output terminal from which a signal decrypted by the decryptor 210 is output.

Figure 5:
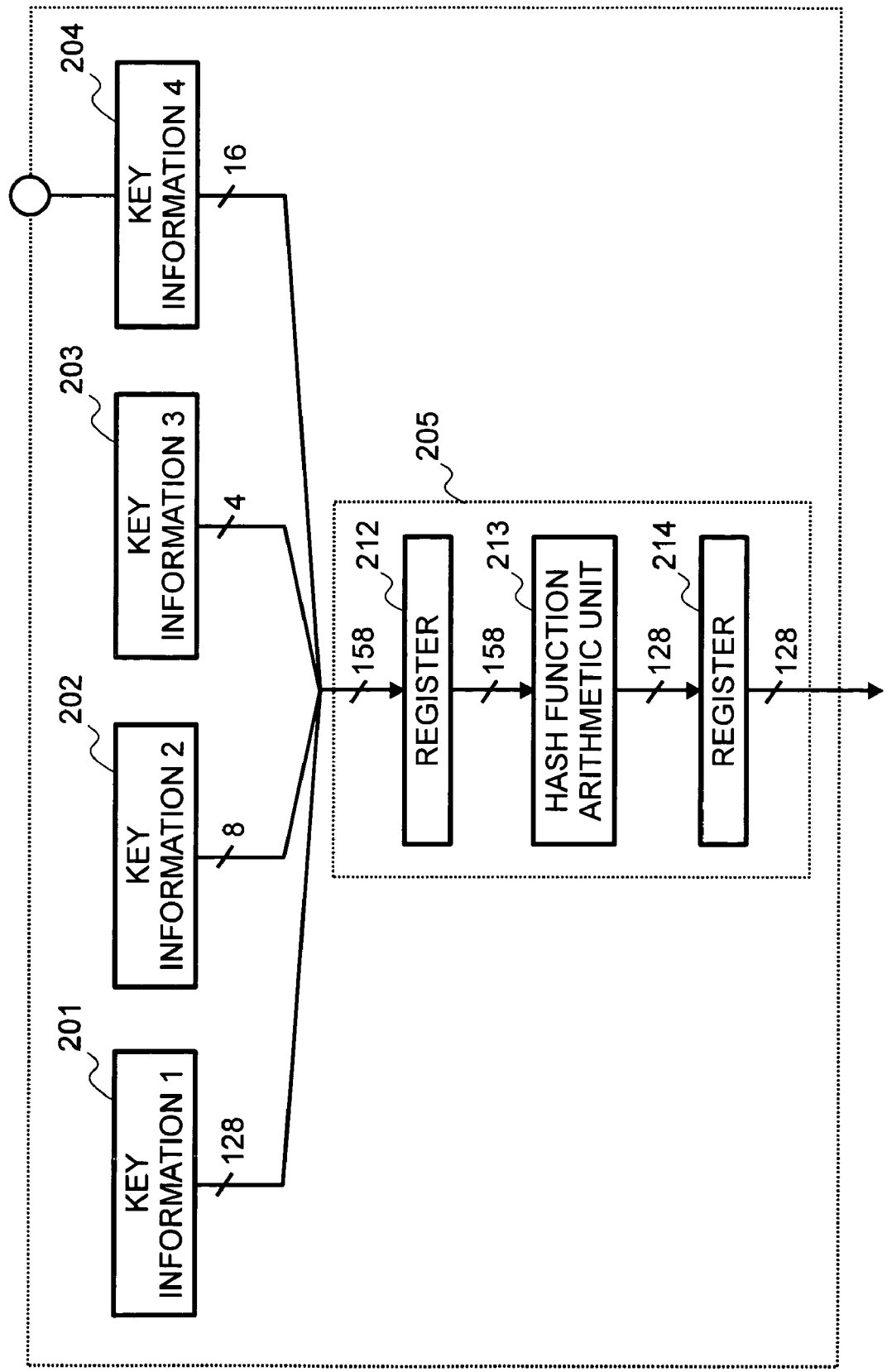
FIG. 5 is a block diagram showing a configuration example of a key generation unit according to the first embodiment of the present invention.

FIG. 5 is a block diagram showing a configuration example of the key generation unit 205. In FIG. 5, the numerals 201, 202, 203 and 204 denote pieces of key information, the numerals 212 and 214 denotes registers, and the numeral 213 denotes a hash function arithmetic unit. The register 212 temporarily retains the key information so as to input the same into the hash function arithmetic unit 213. The register 214 retains the output data operated by the hash function arithmetic unit 213 to make it serve as an encryption key or a decryption key. Here, as an example of the key information, the key information 1 containing 128 bits, the key information 2 containing 8 bits, the key information 3 containing 16 bits, and the key information 4 containing 16 bits are combined to produce 168 bits data, which is then supplied to the hash function arithmetic unit 213. The hash function arithmetic unit 213 performs a hash function using the 168 bits data, and extracts, for example, 128 bits data out of the operation result to make it serve as an encryption key or a decryption key. The hash function is a function that the input data is difficult to analogize from the output result and the key information as secret information is impossible to obtain from the data key. In the present invention, the number of pieces of key information, a combining method thereof, and a bit-wide thereof are not especially limited to those described above.

In the configuration described above, since "the number of copies" as one of the pieces of key information varies every time a move is executed, the key information 506 in the management information region 501 is updated by operating the encryption key in each case.

Since the encryption key differs for the same content every time a move is executed, it is impossible to decrypt the recorded content in the case of falsifying only "the number of copies". The number of moves for the content is therefore reliably restricted, thus realizing the copyright protection with a high degree.

Alternatively, the number of moves can be similarly restricted by changing any one of the pieces of key information 201, 202, 203 and 204 at the time of executing a move.

3. Explanation of Operation

Next, the operation will be described on the assumption that for the content of the file number 1, the copy generation control signal is defined as "Copy One Generation" at the time of recording and the number of moves 509 indicates 3 as the allowable number of moves.

In the first place, at the time of recording, the control unit 10 sets the recording management information 501 such as a destination address for recording the content so as to record the information 501 on the recording medium 6 through the recording control unit 4. Next, the MPEG2-TS is supplied from the input terminal 1. The control signal detection unit 2 detects the copy generation control information embedded in a specific packet of the MPEG2-TS and notifies the control unit 10 of the detection result "10" through the control bus 22. Since the received copy management information was "Copy One Generation", the control unit 10 stores the copy management information as "Copy No More" which indicates that the succeeding copies are prohibited, in the copy information 508 of the content.

Further, the allowable number of copies is 3 at the time of recording the content, and value 2 obtained by subtracting 1 from 3 is accordingly set at the key information 212 to generate an encryption key. The key information used is recorded as the key information 1 in the management information region 501. Thereafter, the recording of the encrypted data on the data region 502 is continued until the recording of the content is over, and the recorded data size is recorded together with the address at the time a predetermined amount of recording is completed, or at the time a content-recording stop request made by a user is input from the remote control interface control unit 23. Although the content is defined as "Copy No More" in the copy management information, moves are allowed up to twice.

Next, the reproducing (moving) of the content of the file number 1 will be described. FIG. 14 shows one embodiment of a user's operation screen usable by connecting the output terminal 12 of the digital information recording and reproducing apparatus 100 to a decoder, a monitor, and the like.

In FIG. 14, (a) shows a list of the recorded pieces of content, (b) shows a screen after transition from (a) to confirm the number of moves, (c) shows a screen after further transition from (b) to select a destination to move, (d) shows an example of a screen on which a move was completed and the allowable number of moves was subtracted, and (e) shows an example of a screen after further transition from (d), on which the allowable number of moves was executed and the piece of content was deleted from the title section. The numeral 401 shows a title of the recorded content, the numeral 402 shows a recording date and time, the numeral 403 shows a recording mode representing a bit rate at the time of recording, the numeral 404 shows the allowable number of moves, and the numeral 405 shows a menu to select a destination to move.

When the control unit 10 detects a signal that indicates that a user has selected "reproduce" or "move" from the remote control interface control unit 23, the control unit 10 reads the management information region 501 recorded on the recording medium 6 to display the screen (a) in FIG. 14 that shows a list of the recorded pieces of content. When the control unit 10 in FIG. 1 detects a signal indicating that the user has selected the title "AAAAA", the control unit 10 reads the information contained in the file number 1 corresponding to the "AAAAA" content. At this point, a transition is made to the screen (b) in FIG. 14 in order to display the allowable number of moves to the user and to wait for the entry of the execution of a move by the user while prompting the user to confirm it.

Accordingly, the user can recognize the allowable number of moves, and can execute a move in consideration of the remaining allowable number of moves.

When a permission to move given by the user is detected, a transition is made to the screen (c) to determine a destination to move. Here, the screens (b) and (c) in FIG. 14 may be the same.

When the user selects a destination to move, the key information 506 is read from the management information in FIG. 2. Next, the read value is set at each piece of key information in the decryption control unit 14 in FIG. 1 to generate a decryption key. Further, the generated decryption key is set to the decryption control unit 14.

The number of moves information update unit 11 makes reference to the number of moves 509 in the management information to retain the value "1" obtained by subtracting "1" from the original value "2". The control unit 10 newly creates the file number n having the same data size as that of the file number 1 in the management information 501 in FIG. 2, and rewrites the value retained by the number of moves information update unit 11 into the value of the number of moves 509. At the same time, the management information of the file number 1 is supplied from the reproducing control unit 7 to the unreproducing control unit 8 where arithmetic processing is carried out so that all bits of the original data are rewritten into, for example, "1" and the resultant thereof is retained.

Even if the arithmetic processing in the unreproducing control unit 8 is carried out by using the key information 506 alone, the original encryption key is not generated. Accordingly, there is an advantage that the same effect as described above can be obtained and time required for the control can be minimized.

Further, after the switching unit 3 is shifted so that a signal can be supplied from the reproducing control unit 7, the content of the specified size is read from the top address recorded in the address 1 to initiate the move processing. At this point, the reproducing control unit 7 changes the copy management information of the target content for move into "Copy One Generation".

The reproduced content is decrypted in the decryption control unit 14 and then is output from the output terminal 12. Simultaneously, the content with the copy management information as "Copy No More" is sequentially recorded from the top address designated in the address n of the file number n through the switching unit 3, the encryption control unit 13, the recording control unit 4, and the memory 9. At this time, the number of copies that is one of the pieces of key information is 1. The recording control unit 4 and the reproducing control unit 7 buffer each piece of content to the memory 9, and control the recording medium 6 in a time-division mode to continuously execute recording and reproducing. When the recording and reproducing of the content of the specified size is completed, the result of the arithmetic processing for the file number 1 retained in the unreproducing control unit 8 is written in the management information region of the file number 1 by the recording control unit 4.

Thereafter, the file number of the management information of the file number n is rewritten into 1, so that the content of the file number 1 in which the number of copies is subtracted by 1 exists on the recording medium 6. The operation screen (d) in FIG. 14 shows the completion of the moves, and the allowable number of copies is changed to "1".

In addition, when carrying out a move of the content with the allowable number of copies as 1, a copy of the content is not generated in the management information region 501 and the management information that was made to be unreproducible in the unreproducing control unit 8 at the time of completion of the move is overwritten into the management information of the file number 1. The content having the title "AAAAA" is thereby deleted as shown in the screen (e).

By employing the above-described configuration, it is possible to realize the recording and reproducing apparatus in which the number of moves is restricted to the content whose copy generation control signal is changed from "Copy One Generation" to "Copy No More" at the time of recording, and therefore, the copyright protection can be realized for the copyright owner of the content. Further, for the user, the same content can be moved to other recording media within the specified number of times and the content still exists in the recording and reproducing apparatus even after the move was executed, accordingly enabling to view the content and improving user-friendliness. Moreover, since there is no need to generate a plurality of the same pieces of content, the capacity of the recording medium 6 can be effectively utilized.

Second Embodiment

4. Example of Application to a Recorder

Figure 6:
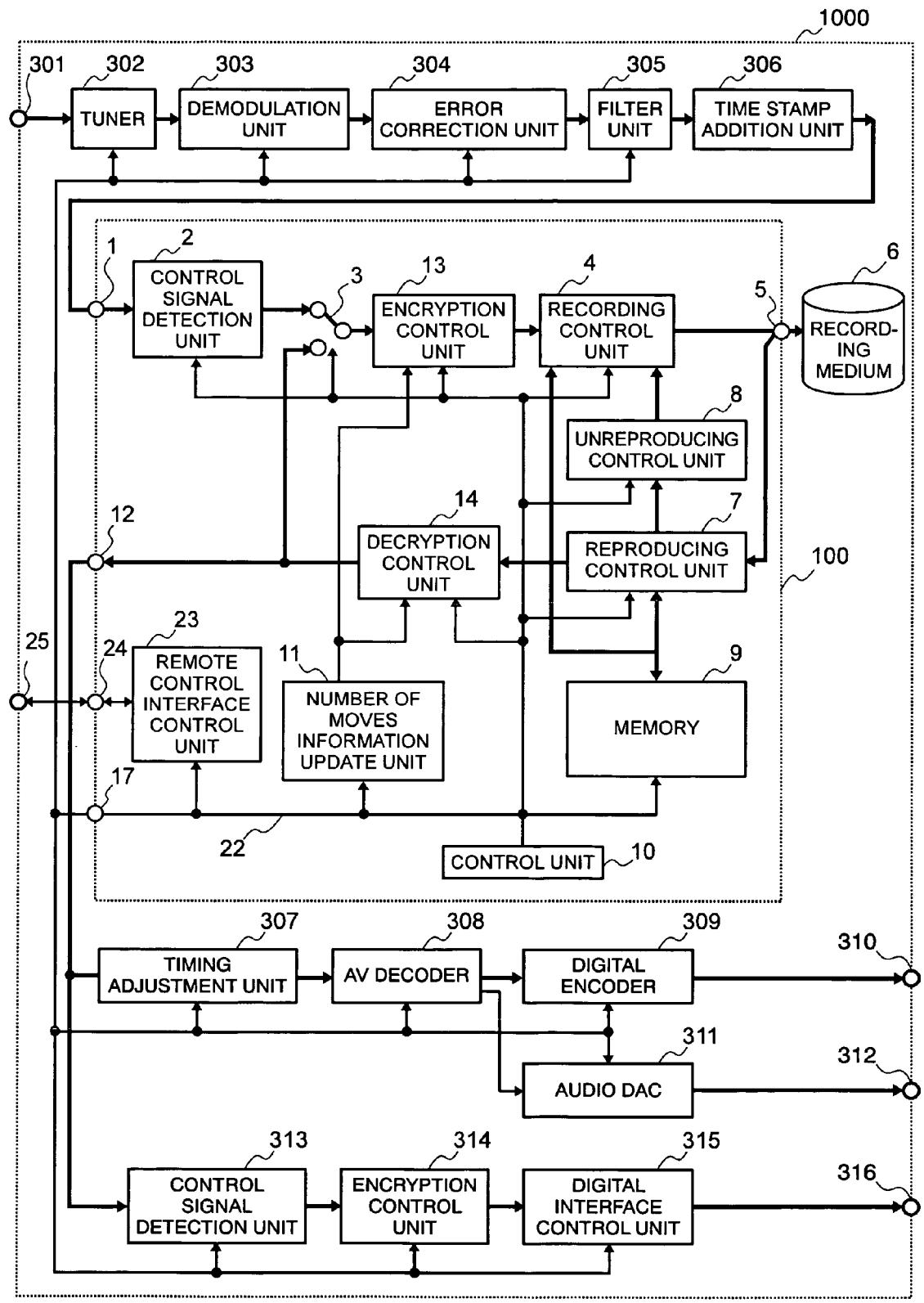
FIG. 6 is a block diagram showing one embodiment of a whole digital information recording and reproducing apparatus according to the second embodiment of the present invention.

Next, with reference to FIG. 6, an explanation will be given to one embodiment in which the digital information recording and reproducing apparatus 100 in the first embodiment is applied to a recorder for digital broadcasting 1000. The elements having the same functions as those described so far will be given the same numerals, and the explanation thereof is omitted.

The numeral 301 denotes an input terminal into which radio waves transmitted through a relay station such as a satellite for broadcasting are input. The numeral 302 denotes a tuner where RF waves are frequency-converted to an Intermediate Frequency band (IF band) to be output to a demodulation unit 303 as a signal in a certain band independent of a reception cannel. The demodulation unit 303 demodulates the bitstream that was modulated for transmission and was supplied from the tuner 302. An error correction unit 304 detects and corrects code errors generated during the transmission to be output to a filter unit 305. The filter unit 305 decodes a transmission cipher for the MPEG2-TS supplied from the error correction unit 304, selects a transponder frequency where programs to be recorded on the recording medium 6 have been multiplexed, and then separates a bitstream in the selected transponder into audio packets and video packets for each program. The numeral 306 denotes a time stamp addition unit. In order to maintain the same intervals between the packets during reproducing as those during receiving in a timing adjustment unit 307 to be described later, the time stamp addition unit 306 detects Presentation Time Stamp (PTS) serving as time management information and System Time Clock (STC) in a reference decoder of an MPEG system from the received packets and adds time stamps in synchronization with the timing corrected on the basis of the detected result. The MPEG2-TS with the time stamps embedded is supplied to the input terminal 1 of the digital information recording and reproducing apparatus 100 and encrypted to be recorded on the recording medium 6.

When reproducing the MPEG2-TS, the timing adjustment unit 307 receives the decrypted MPEG2-TS packets from the output terminal 12 of the digital information recording and reproducing apparatus 100 to make reference to the embedded time stamps. When the PTS, which is the time management information for reproducing and outputting, coincides with the STC, the access unit is reproduced and output. The output data of the timing adjustment unit 307 is supplied to an AV decoder 308 where the input audio packets data and video packets data are decoded. The video data is output to a digital encoder 309 and the audio data is output to an audio DAC 311. The digital encoder 309 converts the video data received from the AV decoder 308 to an output signal for the television, which signal is then output to outside through an output terminal 310. The audio DAC 311 converts the audio data received from the AV decoder 308 to an analog signal, which is then output to outside through an output terminal 312. The output terminal 12 is provided so that in order to execute a move of the content to a second recorder or to a second recording medium, the copy management information is detected in a second control signal detection unit 313 to change "Copy One Generation" to "copy No More", the content encrypted in a second encryption control unit 314 is supplied to a digital interface control unit 315 to be output to the output terminal 316 that is connected to the second recorder or the second recording medium.

This configuration also allows the recorder 1000 to record "Copy One Generation" content for digital broadcasting on, for example, a hard disk as the first recording medium while the content is defined as "Copy No More" content after being recorded on the hard disk as described in the first embodiment, and to have a function of restricting the number of moves to, for example, a DVHS as the removable second recorder, or an optical disk, a memory card or the like as the removable second recording medium. The copyright protection can be accordingly realized for the copyright owner of the content. Further, for the user, the same content can be moved to other recording media within the specified number of times and the content still exists in the recording and reproducing apparatus even after the move was executed, accordingly enabling to view the content and improving user-friendliness. Moreover, since there is no need to generate a plurality of the same pieces of content, the capacity of the hard disk can be effectively utilized.

Even in the case where a second recording control unit is provided instead of the digital interface control unit 315, the specified number of moves to other recording media is similarly possible. In addition, since the moved content is already encrypted at its destination, the copyright protection can be realized.

Third Embodiment

5. Configuration in which Copied Content is Prepared in Advance to be Deleted after Move Next, with reference to FIG. 7, an explanation will be given to one embodiment in which content for move is generated in advance at the time of recording the content and is deleted at the time of executing a move. The elements having the same functions as those described so far will be given the same numerals, and the explanation thereof is omitted.

Figure 7:
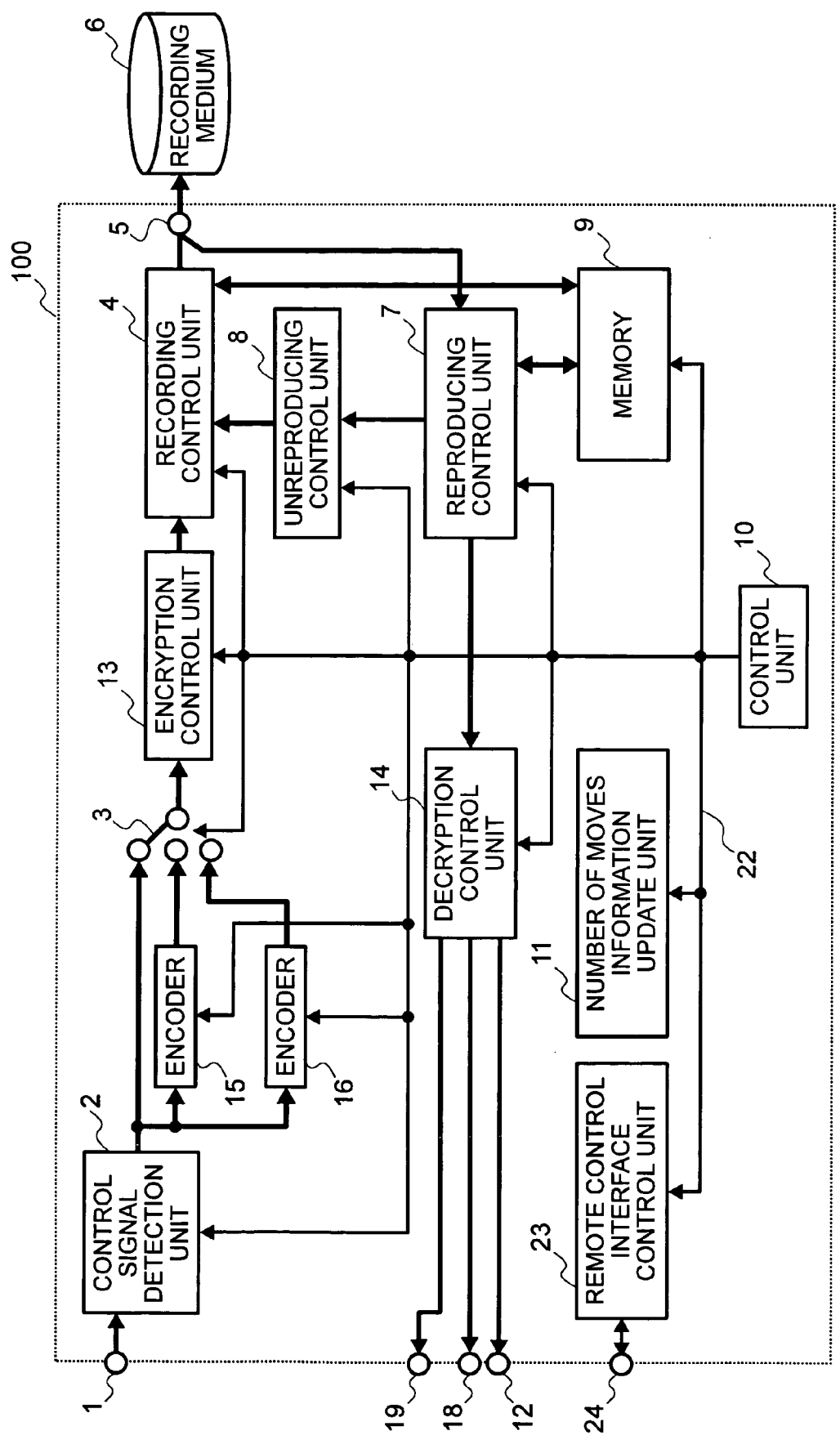
FIG. 7 is a block diagram showing one embodiment of a digital information recording and reproducing apparatus according to the third embodiment of the present invention.

In FIG. 7, the numerals 15 and 16 denote encoders where the input content is encoded at a compression ratio in accordance with the recording capacity of the second and third recording media, each of which is connected to any one of output terminals 12, 18 and 19.

The compression ratio is down-converted, for example, from a High Definition (hereinafter, referred to as HD) format adapted to Hi-Vision broadcasting and the like in digital broadcasting, to a Standard Definition (hereinafter, referred to as SD) format so as to optimize the recording capacity. An encoding method is not limited to this, but an encoder supporting MPEG4 or H.264 can be used to convert the streams to bit rates in accordance with the recording media. The first and second encoders 15 and 16 compress signals from a control signal detection unit 2, which signal is then output to a switching unit 3. The control unit 10 controls the switching unit 3 to make a switch to a time-division mode to supply the outputs of the control signal detection unit 2 and the encoders 15 and 16 to the recording control unit 4 through the encryption control unit 13. The recording control unit 4 buffers the streams to the memory 9 as needed, and further records the streams buffered to the memory 9 on the recording medium 6.

By employing this configuration, three pieces of the same content, that is, the first piece of content at the time of receiving, the second piece of content compressed using the first encoder and the third piece of content compressed using the second decoder can be recorded on the recording medium 6.

FIG. 8 represents one embodiment showing the management information region 501 and the data region 502 in the recording medium 6. In the management information region 501, three files having different bit rates, that is, the file number 0_1, the file number 0_2 and the file number 0_3 are generated for the same content. The number of copies is set to "1" because only one move is allowed for each file. On the basis of the bit rates in the management information, for example, content to be recorded on a card, content to be recorded on an optical disk and content conforming to IEEE1394 are displayed to the user. The content to be recorded on a card is allocated to the output terminal 18 to provide an interface for recording on the card, the content to be recorded on an optical disk is allocated to the output terminal 19 to provide, for example, an ATAPI interface for recording on the optical disk, and the content conforming to IEEE1394 is allocated to the output terminal 12 and the AV decoder 308 to provide an IEEE1394 interface for recording on a D-VHS recorder and the like. This configuration eliminates the need for fine setting when executing a move by making the user select the content to move.

On the contrary, if the user can arbitrarily set bit rates of the encoder 15 or 16, it is possible to generate content having bit rates more suitable for the recording media connected to the output terminals 12, 18, and 19, thus optimizing the capacity of the recording medium 6 and an execution speed of a move.

Setting the same compression ratio to the encoders 15 and 16 allows for generation of two pieces of content with the same compression ratio.

Alternatively, dislocating the encoders 15 and 16 and switching the three paths by the switching unit 3 can also generate three pieces of content with the same compression ratio.

6. Explanation of Operation

Next, the operation of moves for the content recorded on the recording medium 6 will be described using the file number 1_2 as a target for move.

In executing the move of the content, the control unit 10 reads the management information region 501 from the recording medium 6. FIG. 15 shows one embodiment of an operation screen that is operated by a user and is displayed by connecting the output terminal 12 of the digital information recording and reproducing apparatus 100 to a decoder, a monitor, and the like. In FIG. 15, (a) shows a list of the recorded pieces of content, (b) shows a screen after transition from (a) to confirm a movable file, (c) shows a screen after further transition from (b) to select a destination to move, (d) shows a screen after further transition from (c), on which the recording mode for the moved content was deleted, and (e) shows a screen on which the allowable number of moves was executed and the piece of content was deleted from the title section.

When the user executes the "move", the control unit 10 reads the management information region 501 recorded on the recording medium 6 to display the screen (a). If the user selects "BBBBB" corresponding to the file number 1_2, the screen (a) is shifted to the screen (b) to display a file of a movable bit rate.

Next, when "LP mode" is selected as the target file for move, the screen (b) is shifted to the screen (c) to set the destination to move to, for example, "Memory card". When the move is executed, the number of moves information update unit 11 refers to the number of moves 509 in the management information region 501 to change the value into 1 and retain the updated value. At the same time, the control unit 10 supplies the management information of the file number 1_2 from the reproducing control unit 7 to the unreproducing control unit 8 where arithmetic processing is carried out so that all bits of the address 504 are rewritten into, for example, "1". Further, the control unit 10 replaces the value of the number of moves 509 by the value that is retained in the number of moves information update unit, and then retains the result.

From the time of completion of the setting, the move is started, and the content of the specified size is read from the top address recorded in address 5. At this time, the reproducing control unit 7 changes the copy management information of the content for move into "Copy One Generation".

The reproduced content is decrypted and then is output from the output terminal 12. When the reproducing of the content of the specified size is completed, the result of the arithmetic processing for the file number 1_2 retained in the unreproducing control unit 8 is written in the management information region of the file number 1_2 by the recording control unit 4.

As a result, the screen (c) is shifted to the screen (d) on which the "LP mode" is deleted. Further, if the "SP mode" is moved, the screen (d) is shifted to the screen (e) on which the title "BBBBB" corresponding o the file number 1_2 is deleted.

By employing the above-described configuration, it is possible to realize the recording and reproducing apparatus in which the number of moves is restricted to the same pieces of content with different bit rates whose copy generation control signal is changed from "Copy One Generation" to "Copy No More" at the time of recording, and therefore, the copyright protection can be realized for the copyright owner of the content. Further, for the user, the same pieces of content with appropriate bit rates can be moved to other recording media within the specified number of times and the content still exists in the recording and reproducing apparatus even after the move was executed, accordingly enabling to view the content. Moreover, the pieces of content for move are already generated upon recording, which reduces the time required to move and improves user-friendliness.

Fourth Embodiment

7. Example of Application to a Recorder

Figure 9:
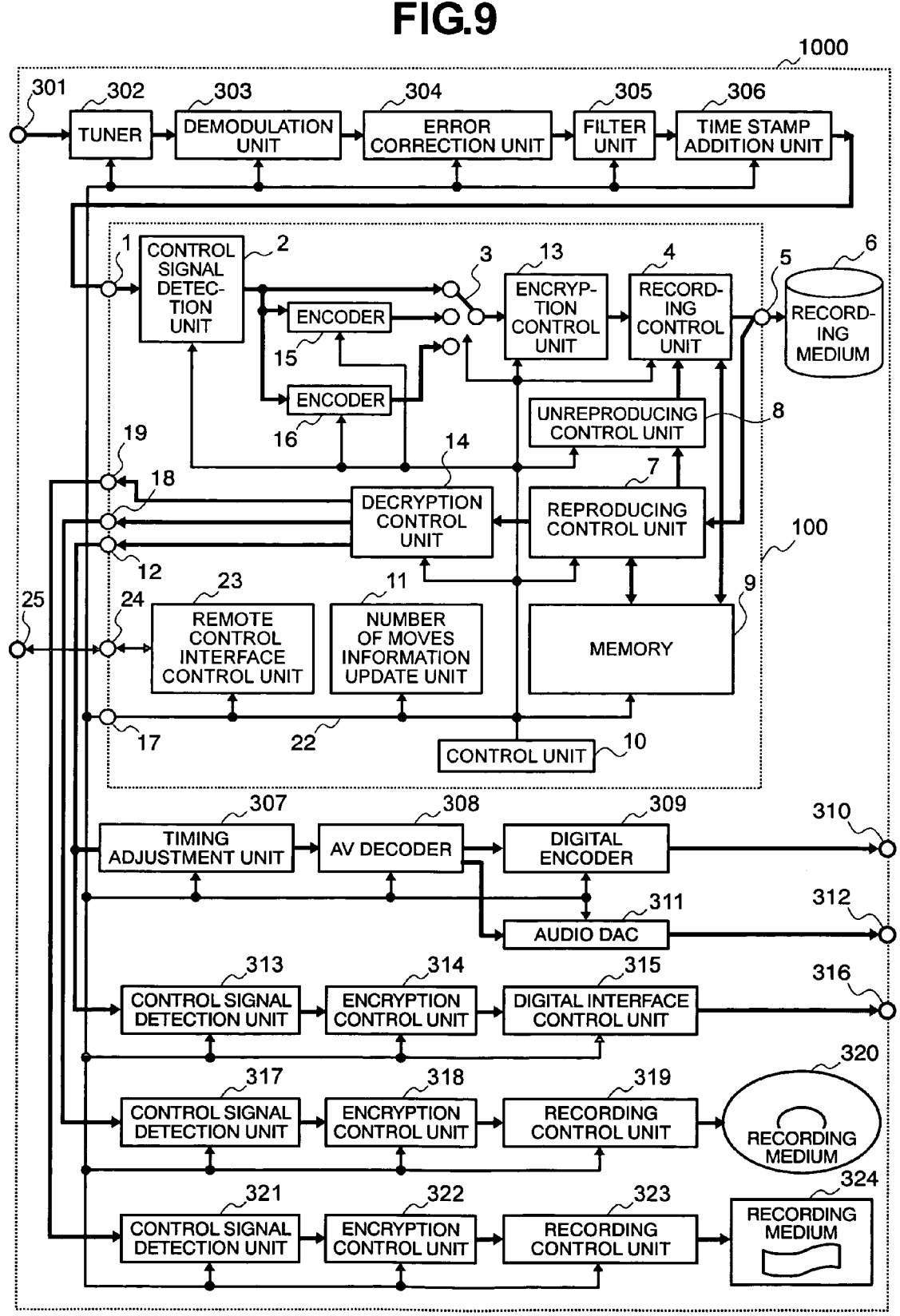
FIG. 9 is a block diagram showing one embodiment of a whole digital information recording and reproducing apparatus according to the fourth embodiment of the present invention.

FIG. 9 is a block diagram showing one embodiment in which the digital information recording and reproducing apparatus in the third embodiment is applied to a recorder for digital broadcasting.

An optical disk, as a second recording medium, is connected to a recording control unit 319, a memory card, as a third recording medium, is connected to a recording control unit 323 and a D-VHS recorder with an IEEE1394 interface, as a fourth recording medium, is connected to an output terminal 316 of the digital interface control unit 315.

By employing this configuration, each piece of content can be moved once to each recording medium. Further, the pieces of content to be output to the output terminals 12, 18 and 19 are switched by the reproducing control unit, so that the same piece of content can be moved twice to the same recording medium.

The copy generation management information is changed from "Copy No More" to "Copy One Generation" in the reproducing control unit to be output from the output terminals 12, 18 and 19. The copy generation management signals are detected to be changed from "Copy One Generation" to "Copy No More" in the control signal detection unit 313, 317 and 321, and each piece of content is recorded in each recording medium. Here, for example, in the case of a Large Scale Integrated Circuit (LSI) in which the digital information recording and reproducing apparatus 100 and the other component elements are integrated, a move may be executed with the copy generation management signals as "Copy No More" by omitting the control signal detection unit 313, 317 and 321. This configuration allows for simplification of the circuit and reduction in cost of the LSI.

By employing the above-described configuration for the recorder for digital broadcasting, it is possible to realize the recording and reproducing apparatus in which the number of moves is restricted to the same pieces of content with different bit rates whose copy generation control signal is changed from "Copy One Generation" to "Copy No More" at the time of recording, and therefore, the copyright protection can be realized for the copyright owner of the content. Further, for the user, the same pieces of content with appropriate bit rates can be moved to other recorders and other recording media within the specified number of times and the content still exists in the recorder for digital broadcasting even after the move was executed, accordingly enabling to view the content. Moreover, the content for move is already generated upon recording, which reduces the time required to move and improves user-friendliness of the recorder for digital broadcasting.

The example of the same pieces of content with different bit rates has been described in the third and fourth embodiments. However, the example is not limited to this, but the same pieces of content with different formats are applicable.

Fifth Embodiment

8. The Number of Rights to Move is Counted Down. Although Copies of Content are Generated Simultaneously with Moves, the User Can See Only the Remaining Number of Rights to Move.

Next, with reference to FIGS. 10 and 16, an explanation will be given to one embodiment in which a piece of content for move is prepared in advance, and when executing a move, the piece of content for move is recorded again so as to notify the user of only the allowable number of moves.

FIG. 16 shows one embodiment of an operation screen that is operated by a user and is displayed by connecting the output terminal 12 of the digital information recording and reproducing apparatus 100 to a decoder, a monitor, and the like. In FIG. 16, (a) shows a list of the recorded pieces of content, (b) shows a screen after transition from (a) to confirm a movable file, (c) shows a screen after further transition from (b) to select a destination to move, (d) shows a screen after transition from (c), on which the recording mode for the moved content was deleted, and (e) shows a screen, on which the allowable number of moves was executed and the piece of content was deleted from the title section.

Figure 10:
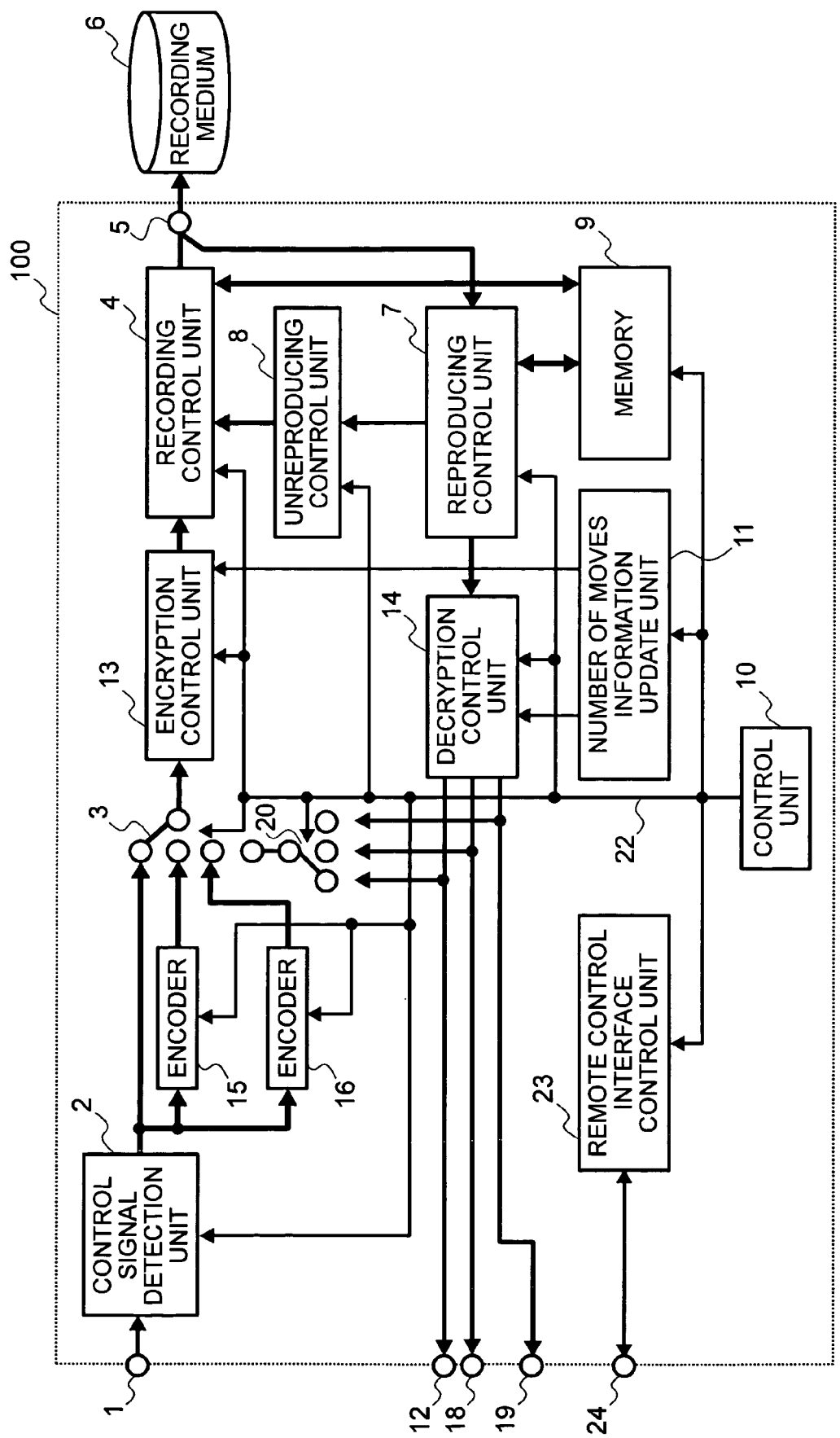
FIG. 10 is a block diagram showing one embodiment of a digital information recording and reproducing apparatus according to the fifth embodiment of the present invention.

The fifth embodiment employs a configuration in which four streams from the control signal detection unit 2, encoder 15, encoder 16 and the decryption control unit 14 are switched by the switching unit 3 in FIG. 10. The outputs from the switching unit 3 are sequentially encrypted in the encryption control unit 13 to be recorded on the recording medium 6 through the recording control unit 4 while being buffered to the memory 9 by the recording control unit 4. The copyright protection of the content can be realized even in the both cases where the same encryption key is used to the same content, and different encryption keys are used to the same content.

A value retained in the number of moves information update unit 11 is used as one of the pieces of key information and the key information is changed for each execution of a move, thus further obtaining the effect of increasing the strong copyright protection of the content in the whole system. This embodiment is the same as the third embodiment in that the encoders 15 and 16 generate the same pieces of content with different bit rates and three file numbers upon recording the content. However, where this embodiment is different from the third embodiment is that: in executing a move, the switching unit 3 is set to be connected to the output of the decryption control unit 14 and the content for move is recorded on the recording medium 6 again by encrypting the same; and the number of moves 509 and the copy information 508 to be recorded in the management information region 501 are in common among the same pieces of content with different bit rates.

In this manner, the allowable number of moves and the bit rates of the content for move are displayed to prompt the user to determine as shown in the screen (b). Upon completion of a move, the screen (b) is shifted to the screen (c) on which the number of moves is subtracted.

Next, in executing a move, the screen (c) is shifted to the screen (d) on which the number of moves is reduced into 1, however, the respective pieces of content with different bit rates exist in the recording media 6, so that the selection of "SP mode" or "LP mode" is available.

When the allowable number of moves becomes 0, all the management information is made to be unreproducible in the unreproducing control unit 8 and the content is deleted from the title section on the screen (e).

FIG. 11 is a diagram showing the management information region 501 and the data region 502 recorded on the recording medium 6. In this example, the copy information 508 and the number of moves 509 are in common on a content basis. In reproducing the content, the content having the bit rate selected by the user is reproduced, and every time a move is completed, the number of moves 509 in common is subtracted. When the number of moves is reduced to 0, the content is deleted from the management information region 501.

By employing the above-described configuration, it is possible to realize the recording and reproducing apparatus in which the number of moves is restricted to the same pieces of content with different bit rates whose copy generation control signal is changed from "Copy One Generation" to "Copy No More" at the time of recording, and therefore, the copyright protection can be realized for the copyright owner of the content. Further, for the user, the same pieces of content with the same bit rate or different bit rates can be moved to other recording media within the specified number of times and the content still exists in the recording and reproducing apparatus even after the move was executed, accordingly enabling to view the content. Moreover, the pieces of content for move are already generated upon recording, which reduces the time required to move. Further, the piece of content of the bit rate once moved is recorded again, a plurality of moves for the piece of content of the same bit rate can be executed as long as within the specified number of times. Furthermore, the user can arbitrarily set the bit rates of the encoders 15, 16 in advance so as to set the capacity optimized in accordance with the second and third recording media, thereby improving user-friendliness.

9. Example of Application to a Recorder.

Figure 12:
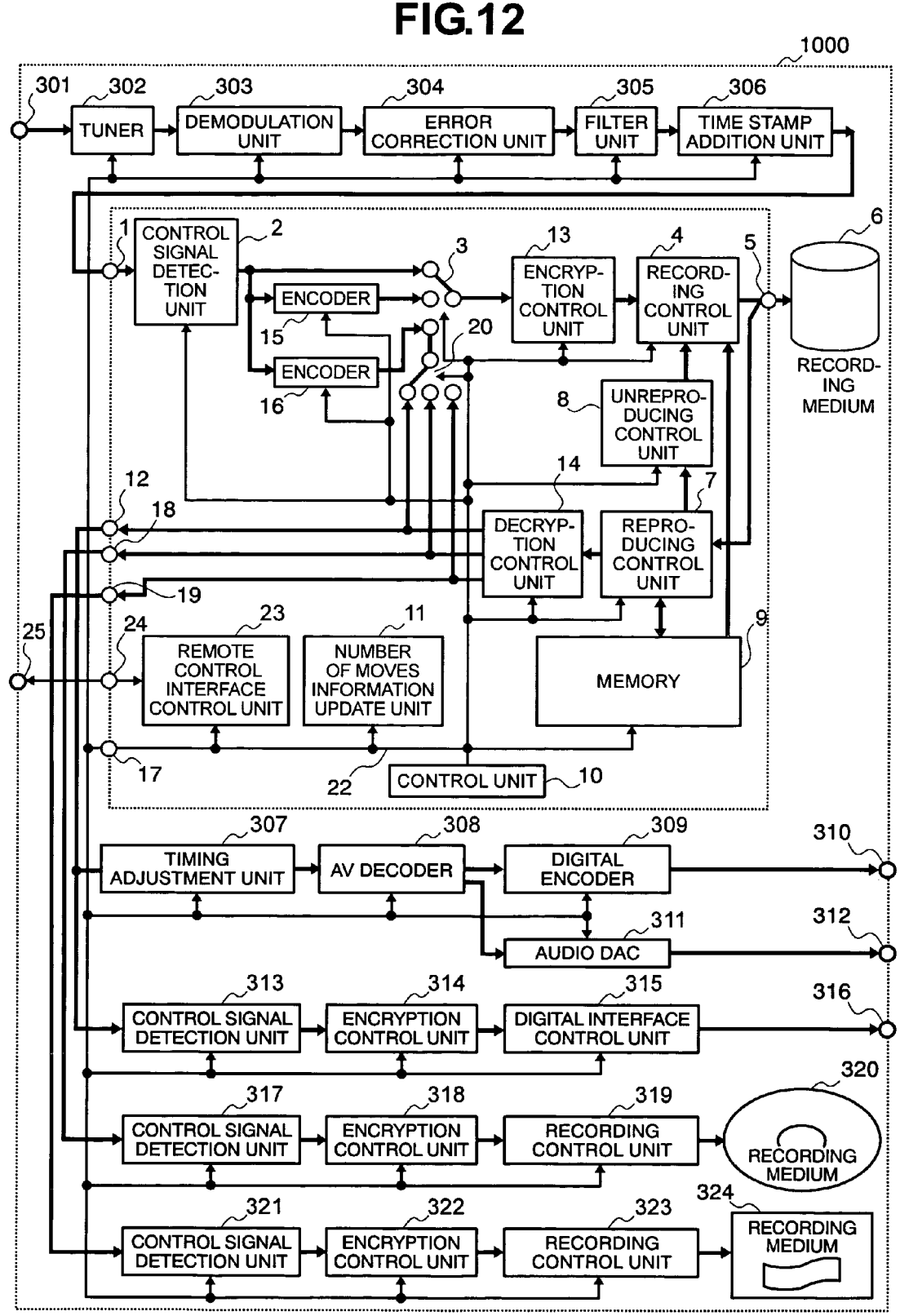
FIG. 12 is a block diagram showing one embodiment of a digital information recording and reproducing apparatus according to the sixth embodiment of the present invention.

FIG. 12 shows one embodiment in which the digital information recording and reproducing apparatus in the fifth embodiment is applied to a recorder for digital broadcasting. From the output terminal 12, the content to be displayed on a display and the content to be moved to the second recording medium are output. From the output terminal 18, the content with the bit rate converted for moving to the third recording medium is output. From the output terminal 19, the content with the bit rate converted for moving to the fourth recording medium is output. The content for move is recorded on the recording medium 6 again through the switching unit 20 and the switching unit 3 and only the number of copies is subtracted. Thus, for example, unless the number of copies information is 0 when the content with the bit rate converted is moved from the output terminal 12, the content with the same bit rate can be moved again thereafter.

By employing the above-described configuration for the recorder for digital broadcasting, it is possible to realize the recorder for digital broadcasting in which the number of moves is restricted to the same pieces of content with different bit rates whose copy generation control signal is changed from "Copy One Generation" to "Copy No More" at the time of recording, and therefore, the copyright protection can be realized for the copyright owner of the content. Further, for the user, the same pieces of content with the same bit rate or different bit rates can be moved to other recording media within the specified number of times and the content still exists in the recorder for digital broadcasting even after the move was executed, accordingly enabling to view the content. Moreover, the pieces of content for move are already generated upon recording, accordingly the time required to move can be reduced. Further, the piece of content of the bit rate once moved is recorded again, a plurality of moves for the piece of content of the same bit rate can be executed as long as within the specified number of times. Furthermore, the user can arbitrarily set the bit rates of the encoders 15, 16 in advance so as to set the capacity optimized in accordance with the second and third recording media, thereby improving user-friendliness of the recorder for digital broadcasting.

Further, even when recording the pieces of content on the second, third and fourth recording media, the pieces of content are encrypted by additionally providing the additional encryption control units 314, 318 and 322 adapted to each format of the recording media, so that the copyright protection for the content can be realized even at the destination to move.

Sixth Embodiment

10. Down-conversion is Executed at Off-time.

Figure 13:
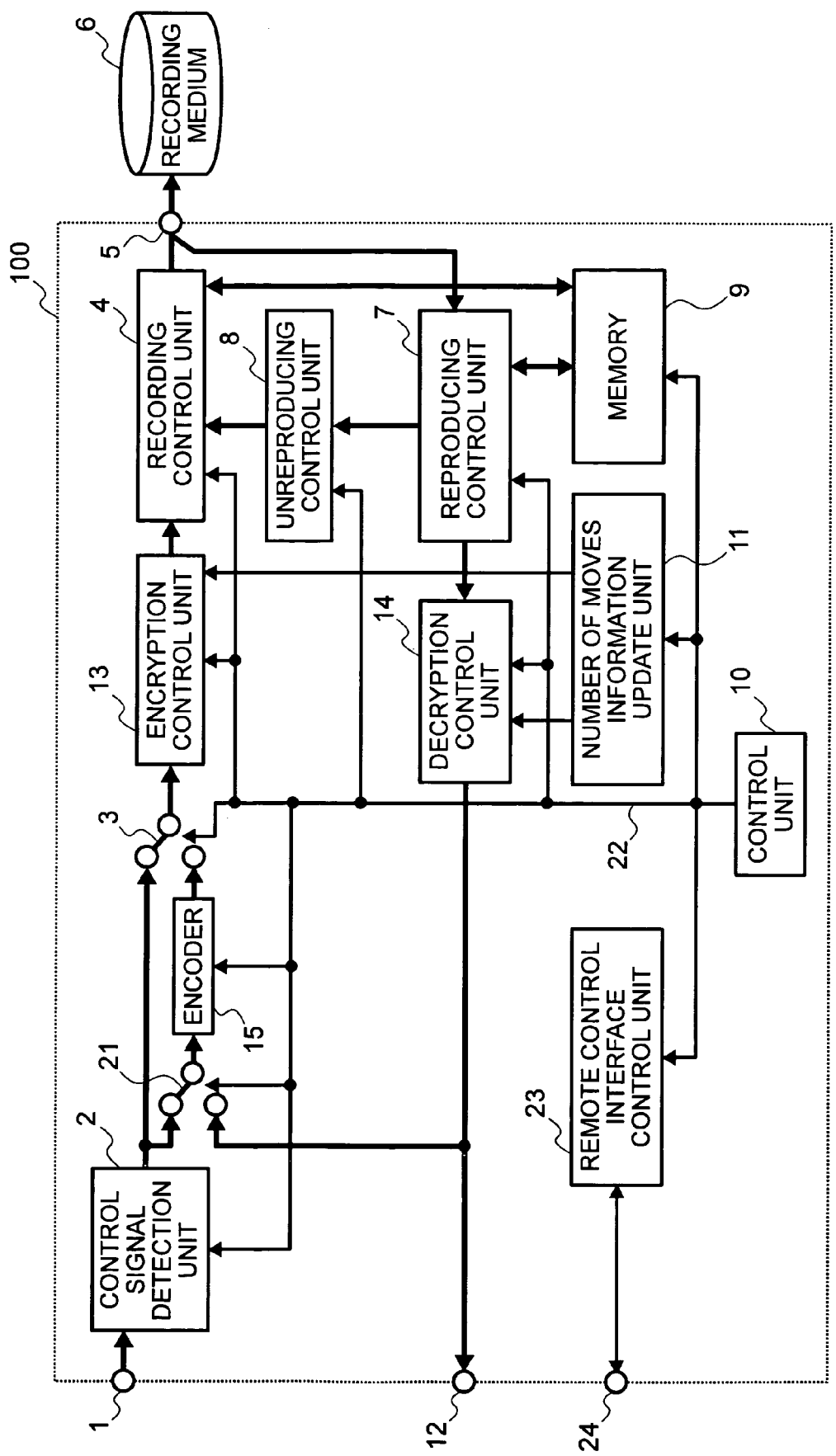
FIG. 13 is a block diagram showing one embodiment of a digital information recording and reproducing apparatus according to the seventh embodiment of the present invention.

Next, an explanation will be given to one embodiment using FIG. 13, in which the content for move is generated by down-converting the recorded content at off-time when the operation of reproducing and recording is not performed.

The encoder 15 is additionally provided with a switching unit 21 at the input, either output of the control signal detection unit 2 or the decryption control unit 14 is supplied thereto. The switching unit 21 usually selects the control signal detection unit 2 to perform compression processing to the bit rate which the user has specified. The switching unit 3 is controlled so as to record either output of the encoder 15 or the control signal detection unit 2 on the recording medium 6. At this time, the control unit 10 is activated at the time timer recording is not set or in the period of time the user designates (e.g., midnight or other time slots) and reproduces the content recorded on the recording medium 6 to generate the limited number of the same pieces of content with the bit rates converted, by switching the switching unit 21 so that the encoder 15 can receive an output from the decryption control unit 14. Every time the content of the bit rate to be converted is reproduced, a new file number is added to new file number 503 in the management information region 501 and the files for move corresponding to the allowable number of copies are generated. If a move is executed at the time the files corresponding the allowable number of copies are not fully generated, the number of files for move to be generated is automatically subtracted so as not to exceed the allowable number of moves.

By employing the above-described configuration, it is possible to realize the recording and reproducing apparatus in which the number of moves is restricted to the content whose copy generation control signal is changed from "Copy One Generation" to "Copy No More" at the time of recording, and therefore, the copyright protection can be realized for the copyright owner of the content. Further, for the user, the same pieces of content with the same bit rate or different bit rates can be moved to other recording media within the specified number of times and the content still exists in the recording and reproducing apparatus even after the move was executed, accordingly enabling to view the content. Moreover, the content for move is already generated during the time the used does not use, accordingly the time required to move can be reduced. Further, the content of the bit rate once moved is recorded again, a plurality of moves for the piece of content with the same bit rate can be executed as long as within the specified number of times, thus improving user-friendliness.

The provision of one encoder 15 enables cost reduction for LSI or the recording and reproducing apparatus.

In this embodiment, the description was given to the case where the content is down-converted at off-time. The present invention is not limited to this, but the content for move may be generated without down-conversion, which improves user-friendliness for the user who desires to execute a move without deteriorating the quality.

Seventh Embodiment

11. Example of a Recorder for Reproducing and Recording Content Recorded on DVD and the Like.

Figure 17:
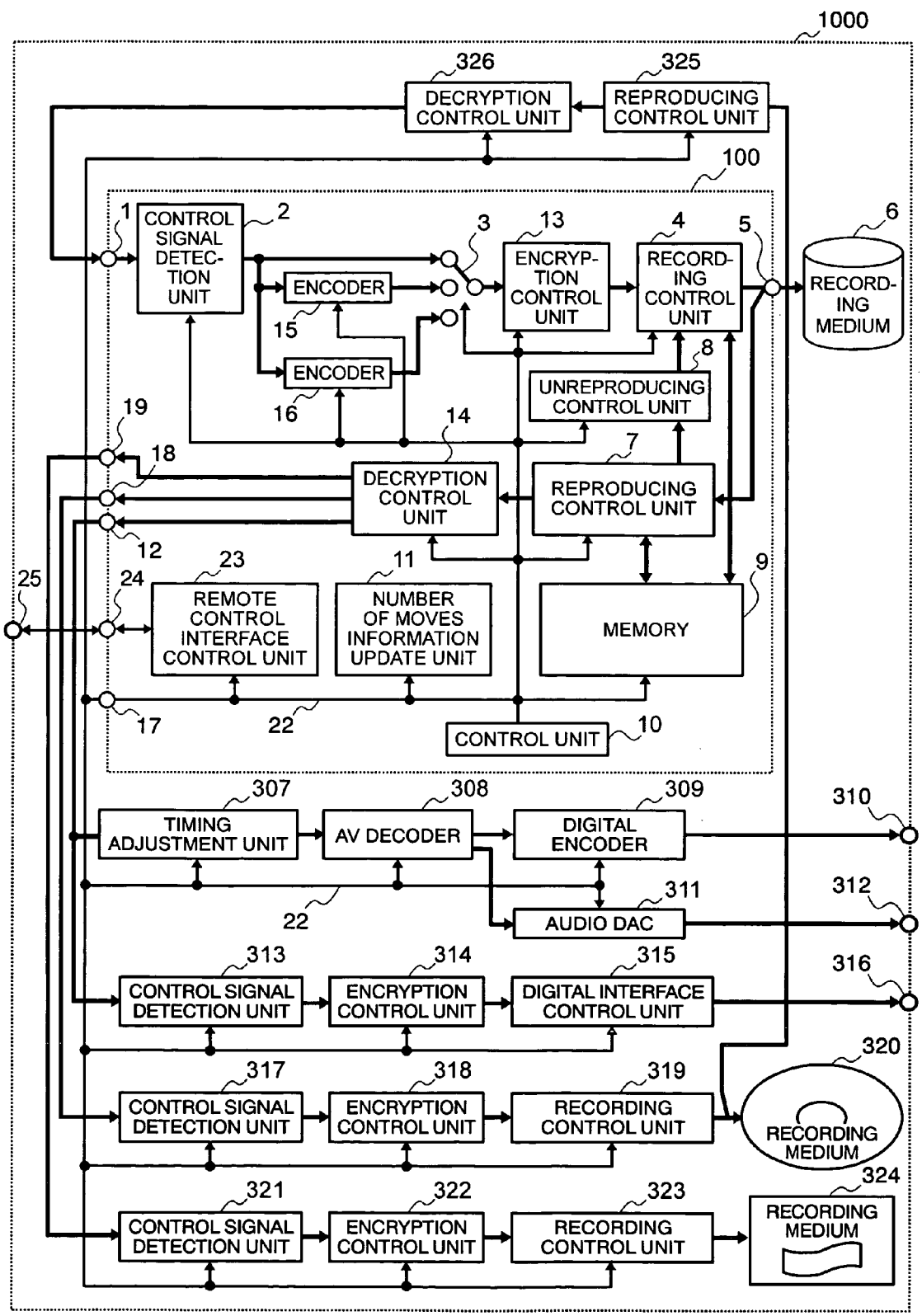
FIG. 17 is a block diagram showing one embodiment of the digital information recording and reproducing apparatus according to the seventh embodiment of the present invention.

FIG. 17 shows one embodiment in which the digital information recording and reproducing apparatus 100 in the fourth embodiment reproduces the content recorded on the second recording medium 320 such as an optical disk and records the same on the first recording medium 6.

The description of this embodiment is based on the assumption that "Copy One Generation" of the copy generation control signal is given in advance to the content recorded on the recording medium 320 by the creator of the recording medium 320.

The recording medium 320 is inserted to a tray of the recorder 1000. When a user inputs a signal indicating initiation of recording, to an input/output unit 25, the content is reproduced from the recording medium 320 by a reproducing control unit 325 and the encrypted content is decrypted in a decryption control unit 326 to be supplied to the input terminal 1.

By employing this configuration, the number of moves can be specified even to the content that is recorded on a recording medium such as an optical disk dedicated to reproducing only, thus improving user-friendliness of the recorder 1000.

Figure 18:
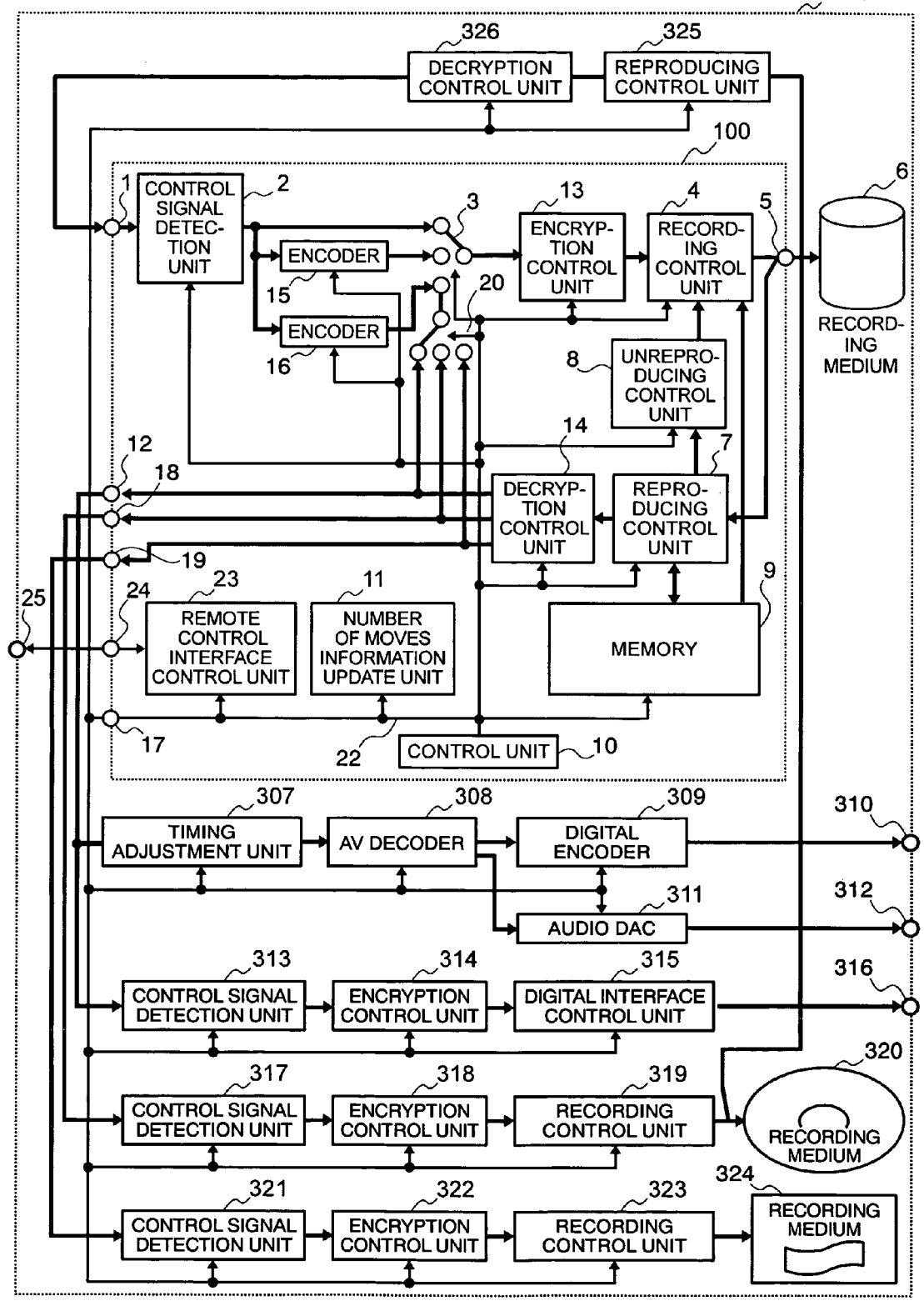
FIG. 18 is a block diagram showing one embodiment of the digital information recording and reproducing apparatus according to the seventh embodiment of the present invention.

FIG. 18 shows one embodiment in which the digital information recording and reproducing apparatus in the fifth embodiment reproduces the content recorded on the second recording medium 320 such as an optical disk and records the same on the first recording medium 6.

Even in this configuration, the number of moves can be specified to the content recorded on the recording medium 320, thus improving user-friendliness of the recorder 1000.

In this case, the content from digital broadcasting or the content from the recording medium 320 to be supplied to the input terminal 1 of the recorder 1000 as shown in FIGS. 17 and 18 may be switched.

The recording medium 324 or the recording medium 320 can be selected to reproduce so that the same effect as described above can be obtained.

Eighth Embodiment

12. Example of a Relationship Between Digital Broadcasting Operation and Recorder.

Next, the whole digital broadcasting system adapted to above described embodiments is described with reference to FIGS. 19 and 20.

FIG. 19 is a block diagram showing one embodiment of the system used in the present invention and an example in which information is transmitted and received via broadcasting and is recorded and reproduced. FIG. 19 includes a digital information recording and reproducing apparatus of the present invention. The numeral 601 denotes an information service station such as a broadcasting station, 602 denotes a relay station, 1000 denotes a recorder including the digital information recording and reproducing apparatus, 604 denotes a display, and 605 denotes a second recording and reproducing apparatus. Note that when recording the broadcast and the like, one or both of the first recording medium 6 included in the digital information recording and reproducing apparatus and the second recording and reproducing apparatus 605 is available for recording.

The information service station 601 such as a broadcasting station transmits signal waves modulated in the information service station 601 through the relay station 602 such as a satellite for broadcasting. Of course, transmissions by cables, telephone lines, ground-based broadcasting or the like may be used. The signal waves received at the recorder 1000 on the receiving side are demodulated, and then the demodulated information signals are converted to signals suitable for being recorded on the first recording medium 6 and the second recording and reproducing apparatus 605, as needed. Alternatively, the signals are supplied to the display 604 on which the user can directly view details of the information.

The information reproduced in the first recording medium 6 and the second recording and reproducing apparatus 605 is supplied to the display 604 through the recorder 1000 and the original video and audio information and the like are viewed. When a detachable recording medium on which information is recorded in advance is provided, for example, the succeeding operation after the reproducing operation in the second recording and reproducing apparatus 605 provided with the detachable recording medium is carried out. Digital signals are used in transmitting/receiving the information among apparatuses in most cases, however, analog signals are used, for example, between the recorder 1000 and the display 604 in some cases.

FIG. 20 is a block diagram showing a configuration example of the information service station 601 such as a broadcasting station of the above-described system. The numeral 701 denotes a source generation unit, 702 denotes an encode circuit for compressing signals in the MPEG system and the like, 703 denotes a scramble circuit, 704 denotes a modulation circuit, 705 denotes a transmission antenna, 706 denotes a management information addition circuit, and 707 denotes an input terminal. Video and audio information and the like generated in the source generation unit 701 comprising a camera, a recording and reproducing apparatus and the like are compressed in the encode circuit 702 so that the information can be transmitted in a less occupied band. The compressed data is encrypted for transmission in the scramble circuit 703 as needed so that only specific viewers can view the information. The information data is modulated in the modulation circuit 704 so that signals are suitable for transmission, and then the modulated signals are transmitted as radio waves from the transmission antenna 705 toward the relay station 602 such as a satellite for broadcasting. At this time, in the management information addition circuit 706, the information such as a current time and copy control information are added. From an input terminal 707, for example, request information is input through a telephone line and the like, which is omitted in FIG. 19. This system is utilized in a system such as video-on-demand that determines information to be transmitted in accordance with requests from viewers. In practical steps, a plurality of pieces of information are multiplexed on one radio wave in a time division system, a spread spectrum system, or the like in most cases.

Although not shown in FIG. 20 for the sake of simplification, in this case, a plurality of channels are provided between the source generation unit 701 and the encode circuit 702, and a multiplex circuit for multiplexing a plurality of pieces of information is provided between the encode circuit 702 and the scramble circuit 703. The digital broadcasting operator can specify the number of moves to the content in the management information addition circuit 706, and accordingly, the number of moves can be restricted in the digital information recording and reproducing apparatus 100. Thus, for the copyright owner, the copyright protection of the content can be realized, and for the user, it is possible to operate the digital broadcasting system with the improved user-friendliness, in which moves of the same content can be allowed within the number of times specified by the digital broadcasting station side.

In FIGS. 19 and 20, the information is transmitted through the relay station from the transmission antenna, and this invention is, however, not limited to this. For example, the information service station may serve as a server, and the information may be transmitted from the server to the digital information recording and reproducing apparatus over the Internet.

It is obvious that a combination of the above described embodiments is one of the embodiments of the present invention.

The foregoing invention has been described in terms of preferred embodiments. However, those skilled, in the art will recognize that many variations of such embodiments exist. Such variations are intended to be within the scope of the present invention and the appended claims.

The invention claimed is:

1. A digital information recording and reproducing apparatus for inputting digital information and for recording and reproducing the input digital information, comprising:
   a detector circuit for detecting copy control information accompanying the input digital information, the copy control information indicative of whether or not the input digital information can be copied;
   an encrypting circuit for encrypting the input digital information;
   a first recording circuit for recording to a first recording medium the input digital information encrypted by the encrypting circuit and the copy control information;
   a reproducing circuit for reproducing the encrypted digital information and the copy control information recorded to the first recording medium and for decrypting the encrypted digital information;
   a second recording circuit for recording to a second recording medium digital information reproduced by the reproducing circuit; and
   a control circuit for controlling the first and second recording circuits and the reproducing circuit,
   wherein when the copy control information that is stored on the first recording medium is detected by the detector circuit as being of type Copy One Generation, which indicates that copying of only one generation of the digital information is allowed so that the digital information is restricted in the number of times it can be transferred, then the control circuit controls the second recording circuit and the reproducing circuit such that the digital information reproduced by the reproducing circuit is recorded to the second recording medium by the second recording circuit and, concurrently, the digital information reproduced by the reproducing circuit is encrypted to produce different encrypted digital information that replaces the encrypted digital information originally recorded in the first recording medium.

* * * * *